(12) United States Patent
Zadro

(10) Patent No.: US 6,799,335 B1
(45) Date of Patent: Oct. 5, 2004

(54) OMNI-DIRECTIONALLY ADJUSTABLE RIGID-ARM FOGLESS SHOWER MIRROR

(76) Inventor: Zlatko Zadro, 5422 Argosy Dr., Huntington Beach, CA (US) 92649

( * ) Notice: Subject to any disclaimer, the term of this patent is extended or adjusted under 35 U.S.C. 154(b) by 0 days.

(21) Appl. No.: 10/340,937

(22) Filed: Jan. 13, 2003

(51) Int. Cl.[7] .............................. A47K 3/22; A47K 3/28
(52) U.S. Cl. ........................................... 4/605; 359/509
(58) Field of Search ........................... 4/567, 597, 605, 4/559; 359/507, 509, 512–514

(56) References Cited

U.S. PATENT DOCUMENTS

| | | | | |
|---|---|---|---|---|
| 4,557,003 A | * | 12/1985 | Jones | ............................. 4/605 |
| 5,032,015 A | * | 7/1991 | Christianson | ................ 359/512 |
| 5,953,157 A | * | 9/1999 | Christianson | ................ 359/509 |
| 6,238,052 B1 | * | 5/2001 | Zadro | .......................... 359/507 |

* cited by examiner

Primary Examiner—Tuan N. Nguyen
(74) Attorney, Agent, or Firm—William L. Chapin

(57) ABSTRACT

A fogless mirror for use in showers includes a shower arm adapter having a tubular body attachable at one end to a shower arm and at the other end to a shower nozzle; a bore disposed longitudinally through the tubular body conveys warm water from the shower arm to the nozzle, and a small orifice disposed radially through the tubular body diverts a small portion of water conveyed through the bore. A first rotatable coupler rotatably mounted to the shower arm adapter and angularly adjustable in a first plane conducts water diverted from the bore of the tubular body into a first outlet port boss. A second rotatable coupler rotatably mounted to the first outlet port boss and angularly adjustable in a second plane conducts water through a rigid tubular support arm to a mirror support frame, heating the mirror and thereby inhibiting condensation fogging thereof.

23 Claims, 21 Drawing Sheets

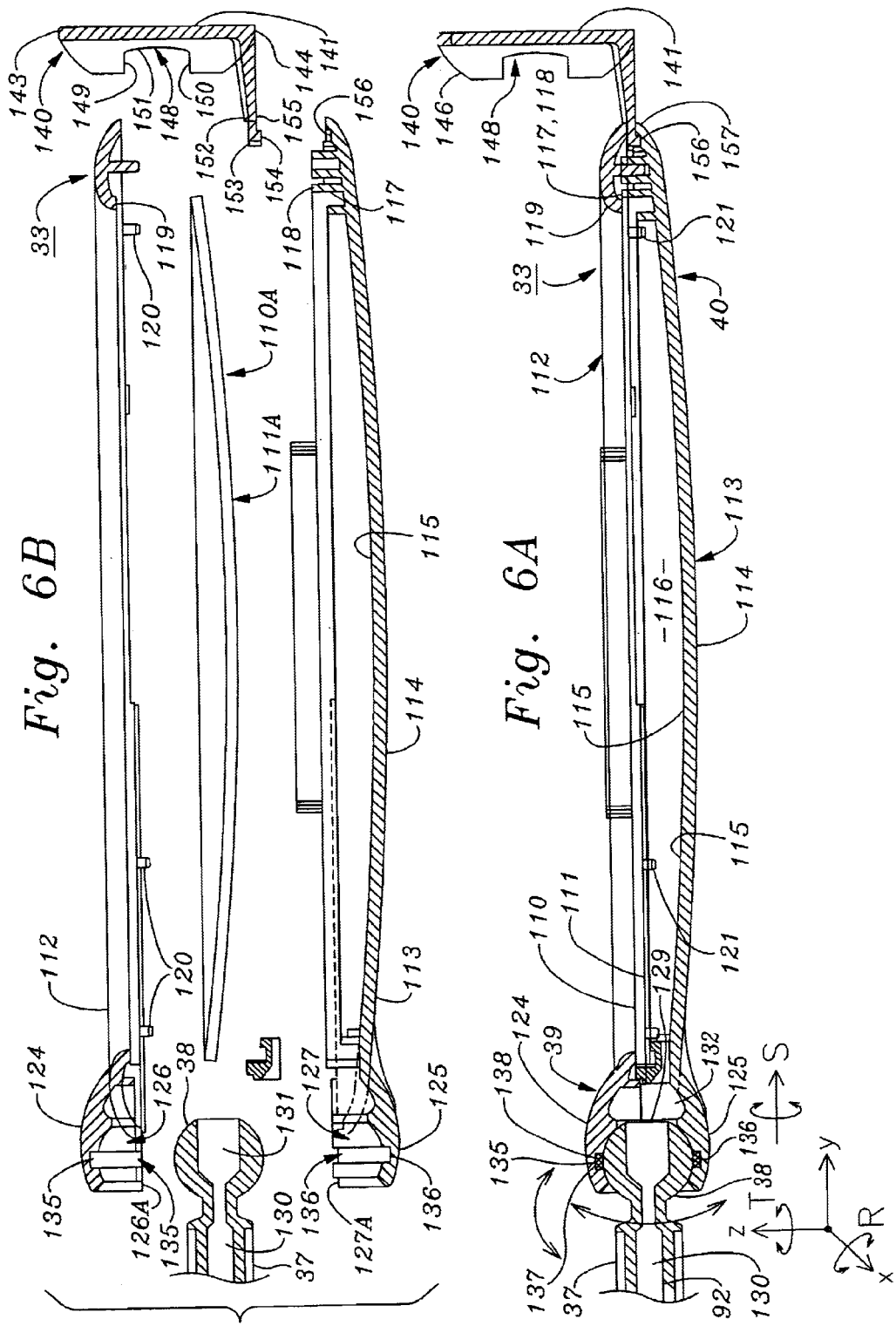

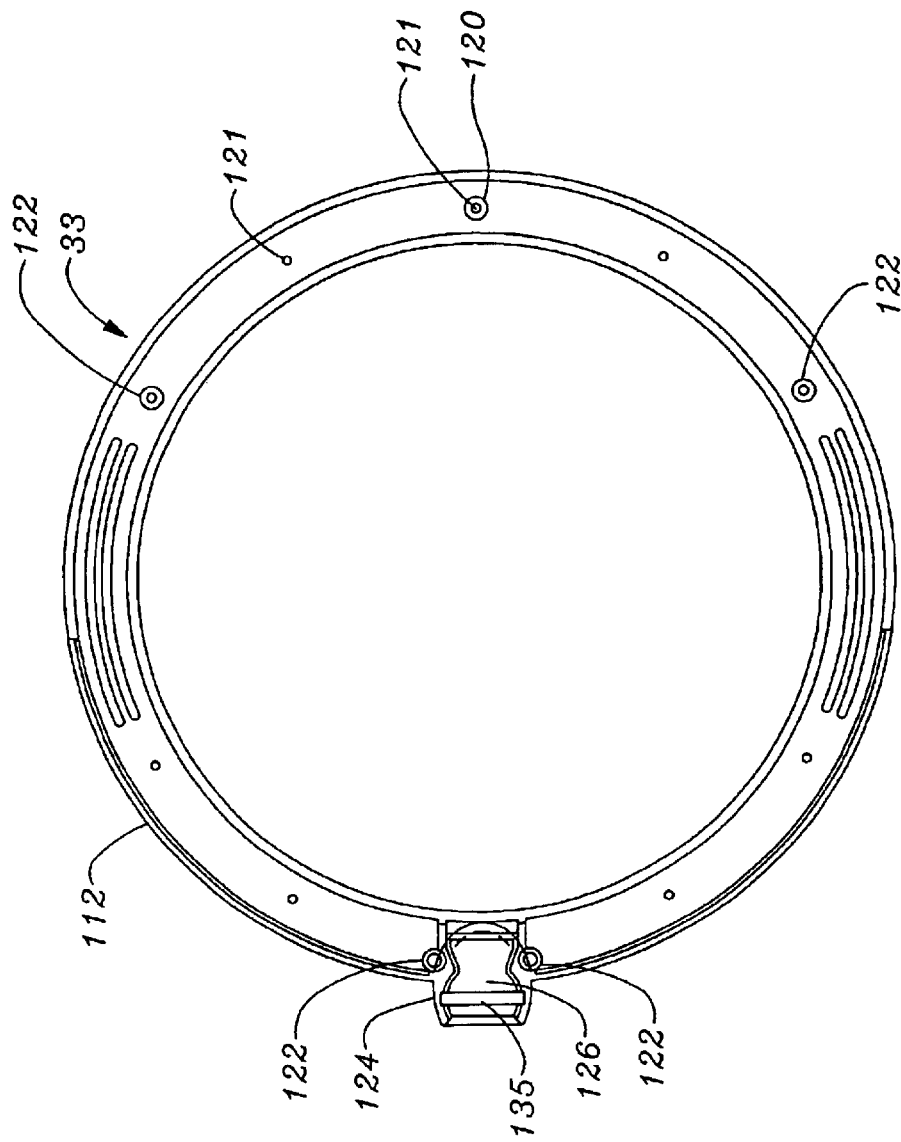

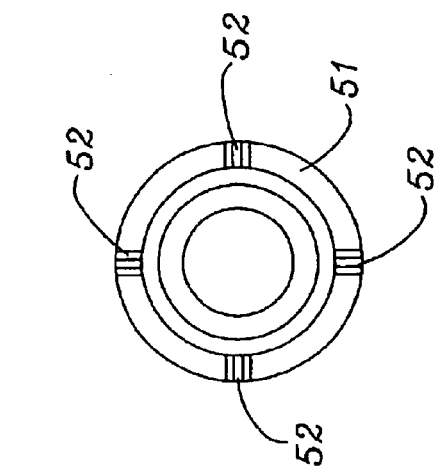
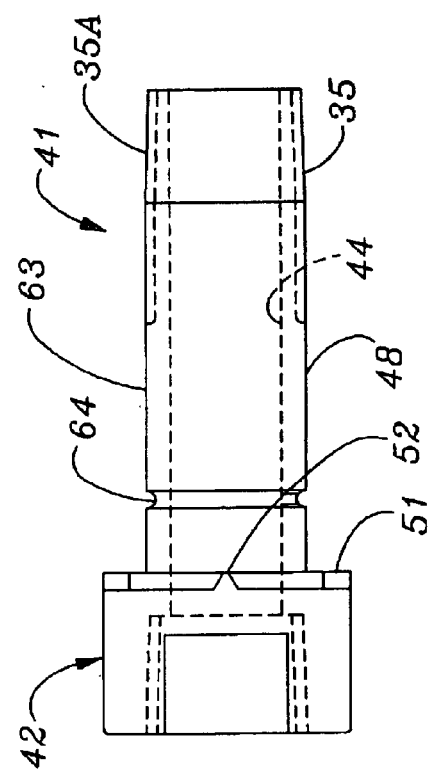
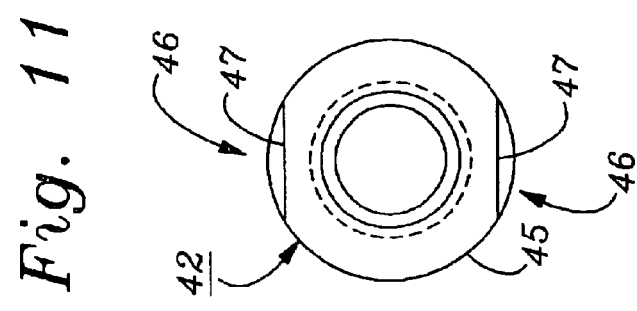

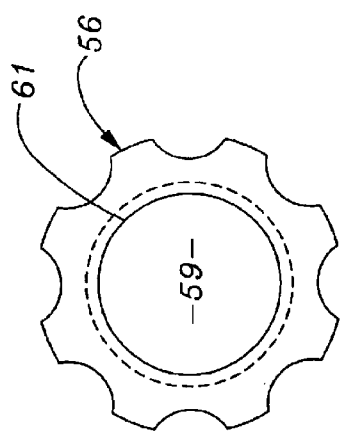
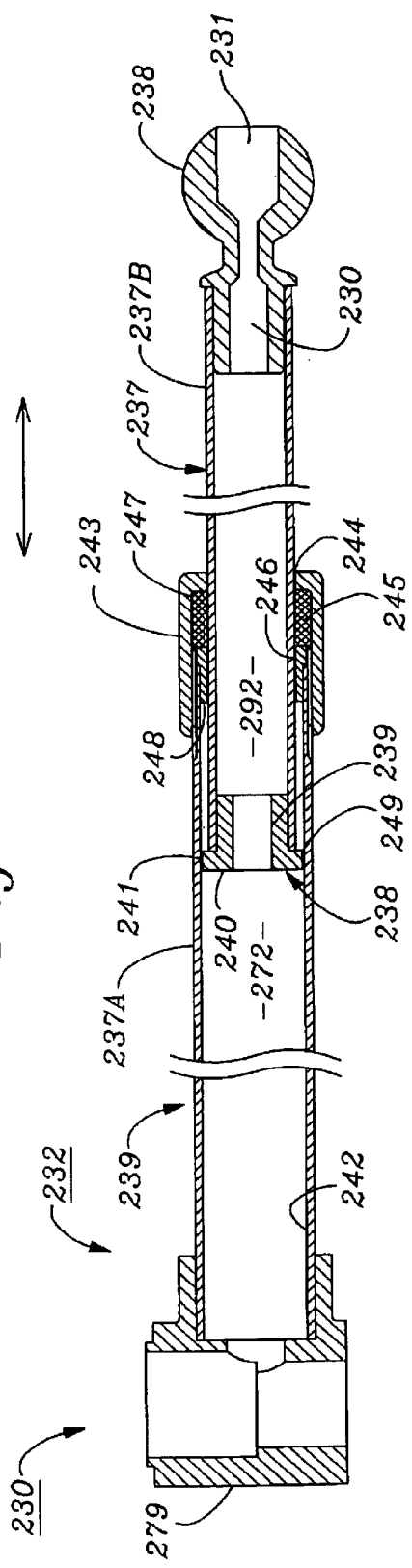

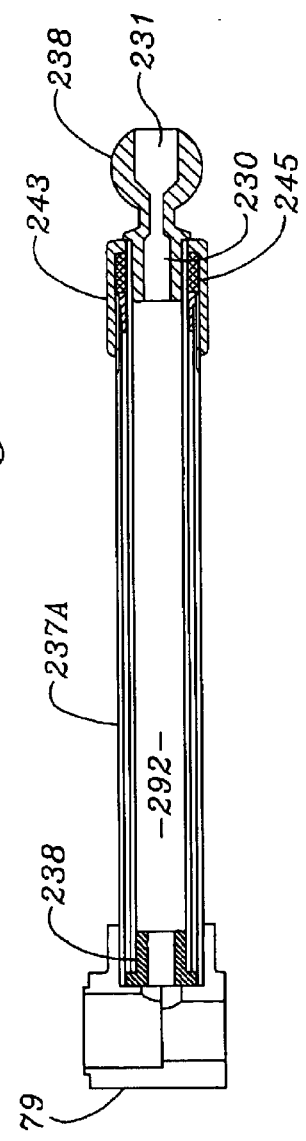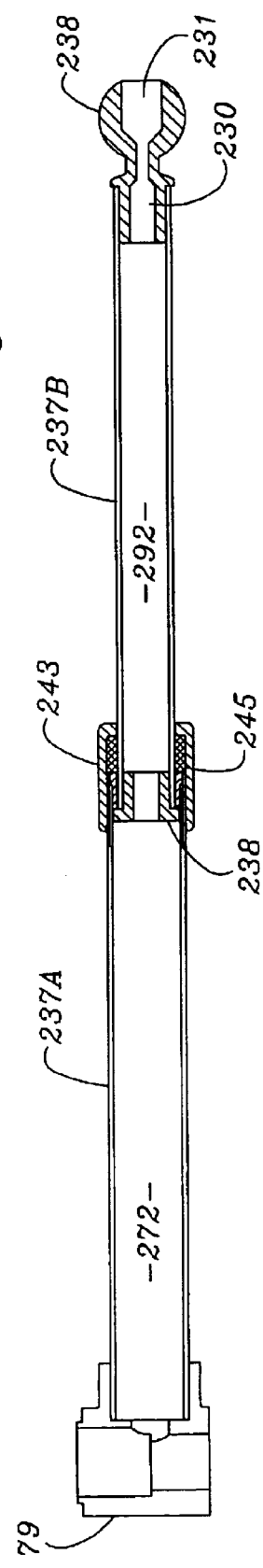

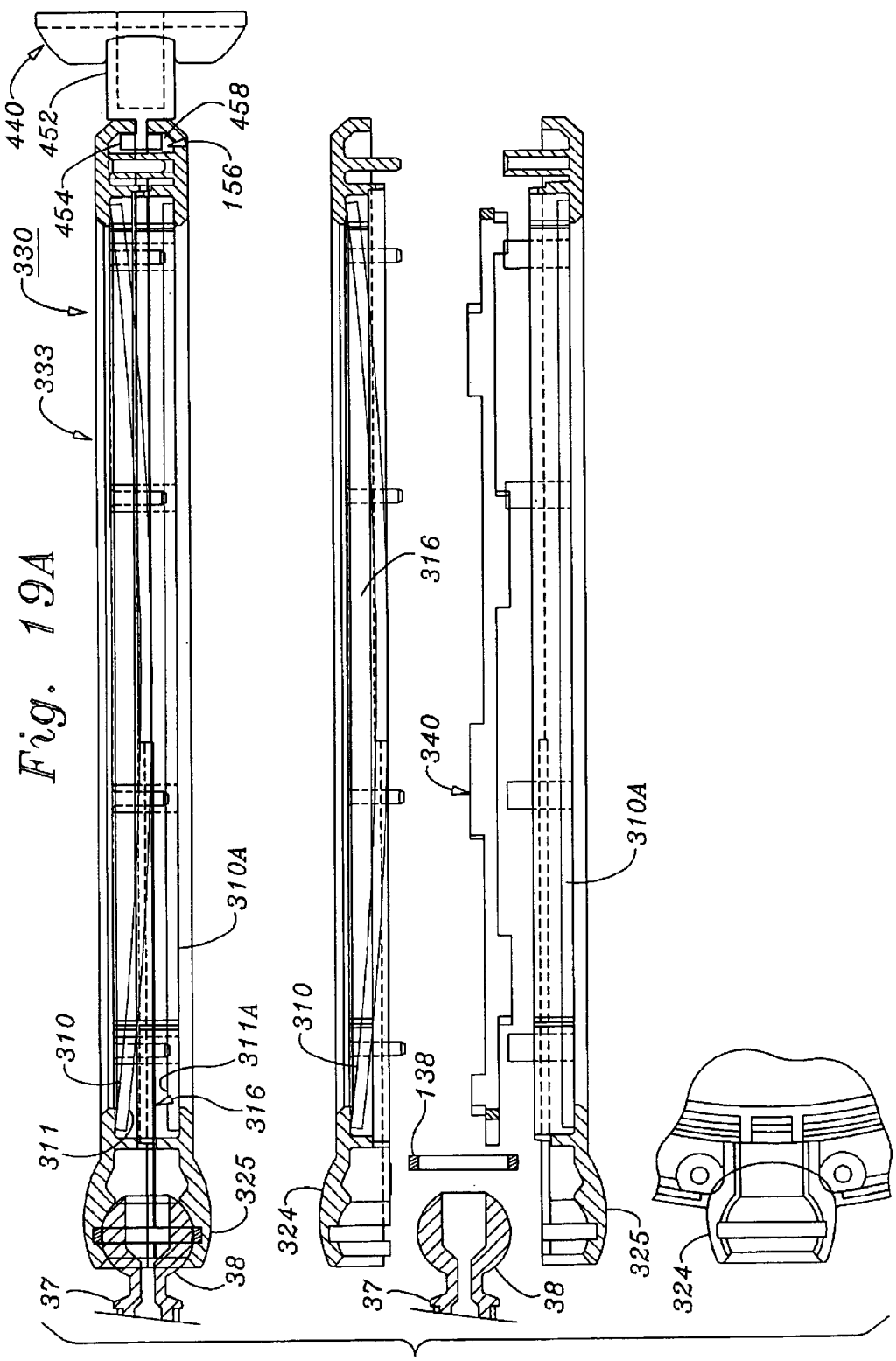

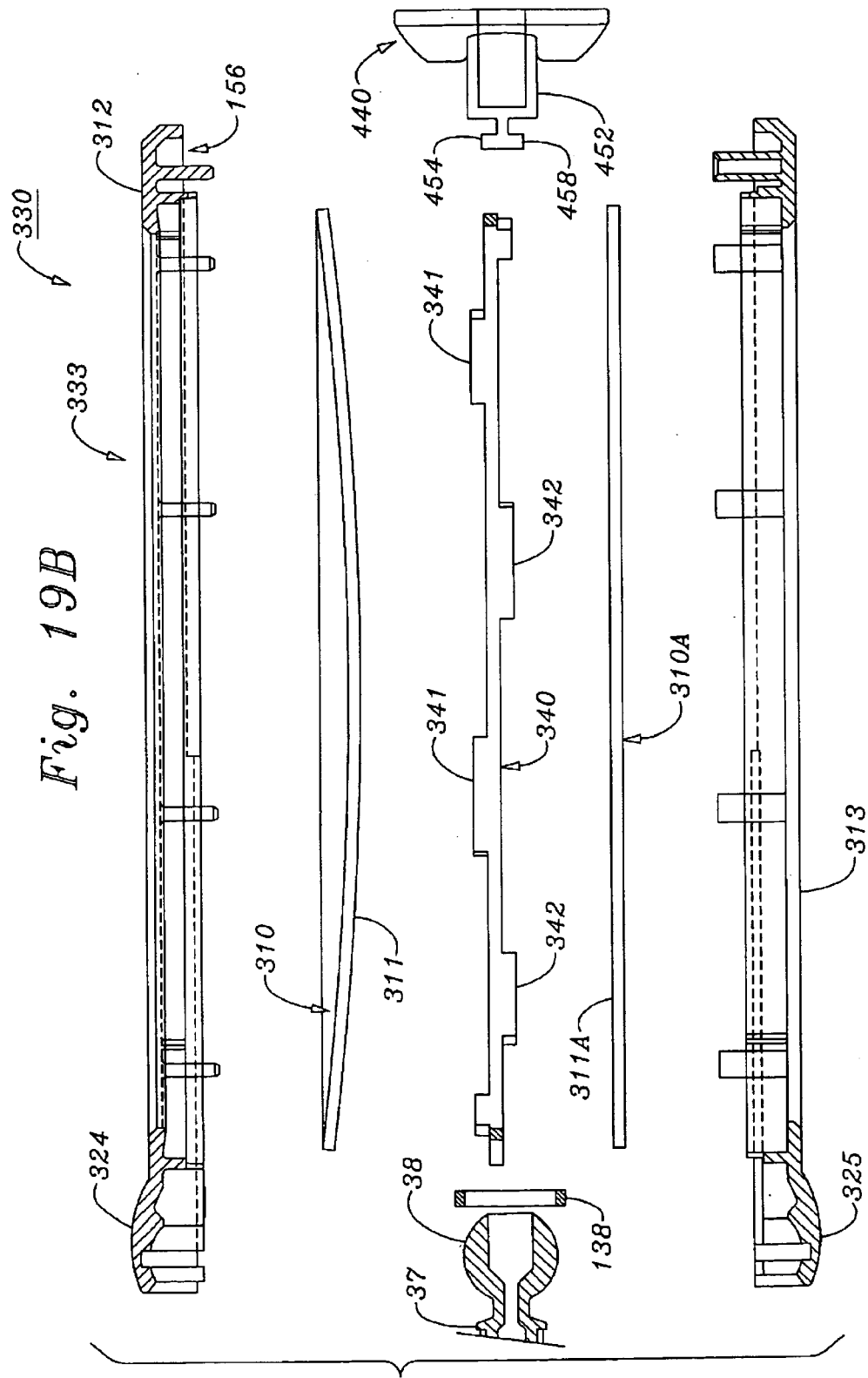

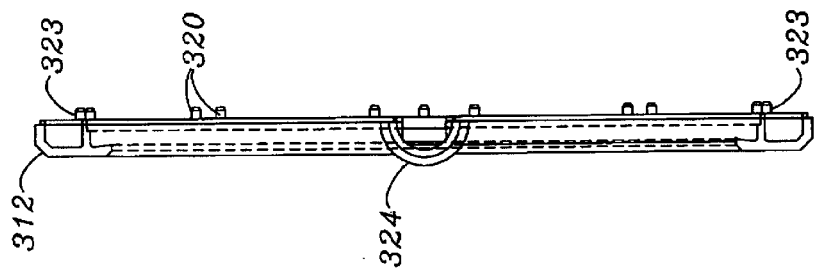
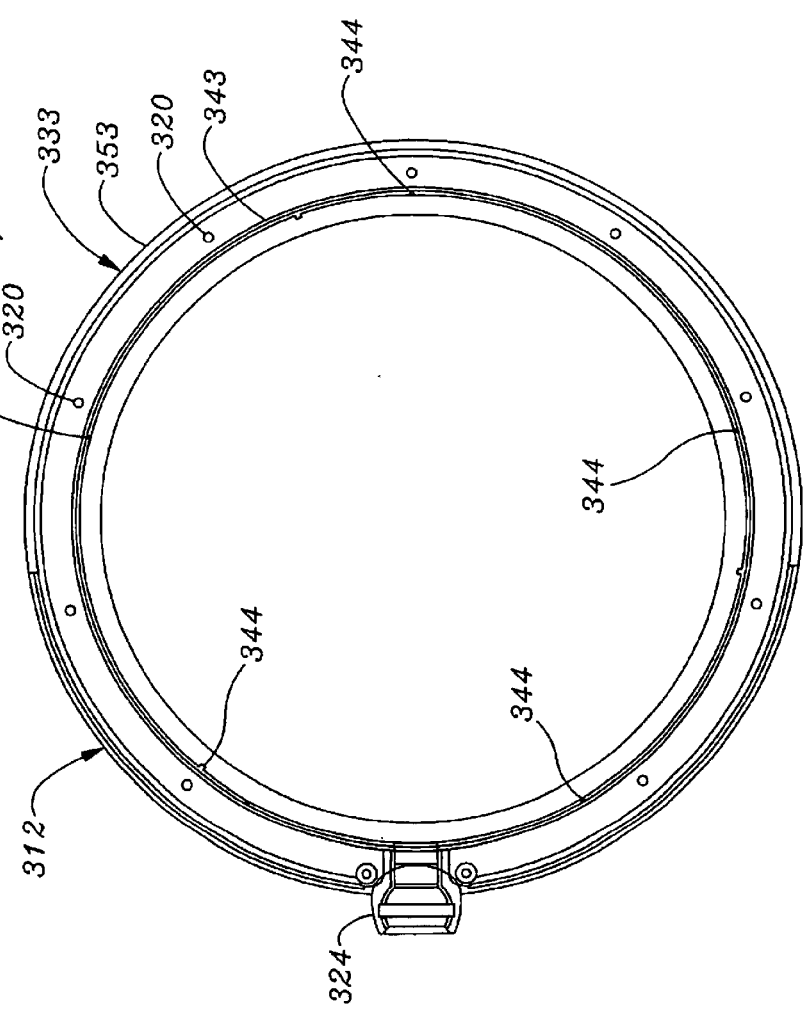

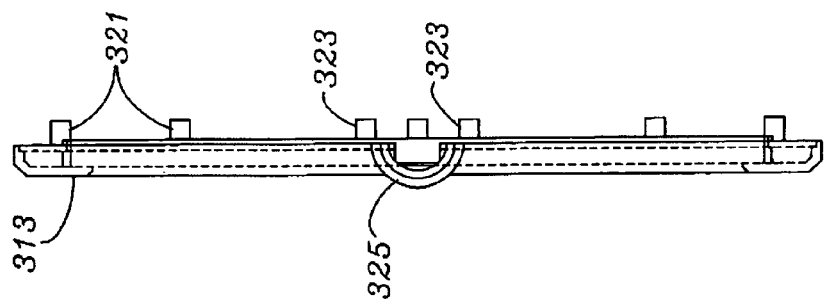
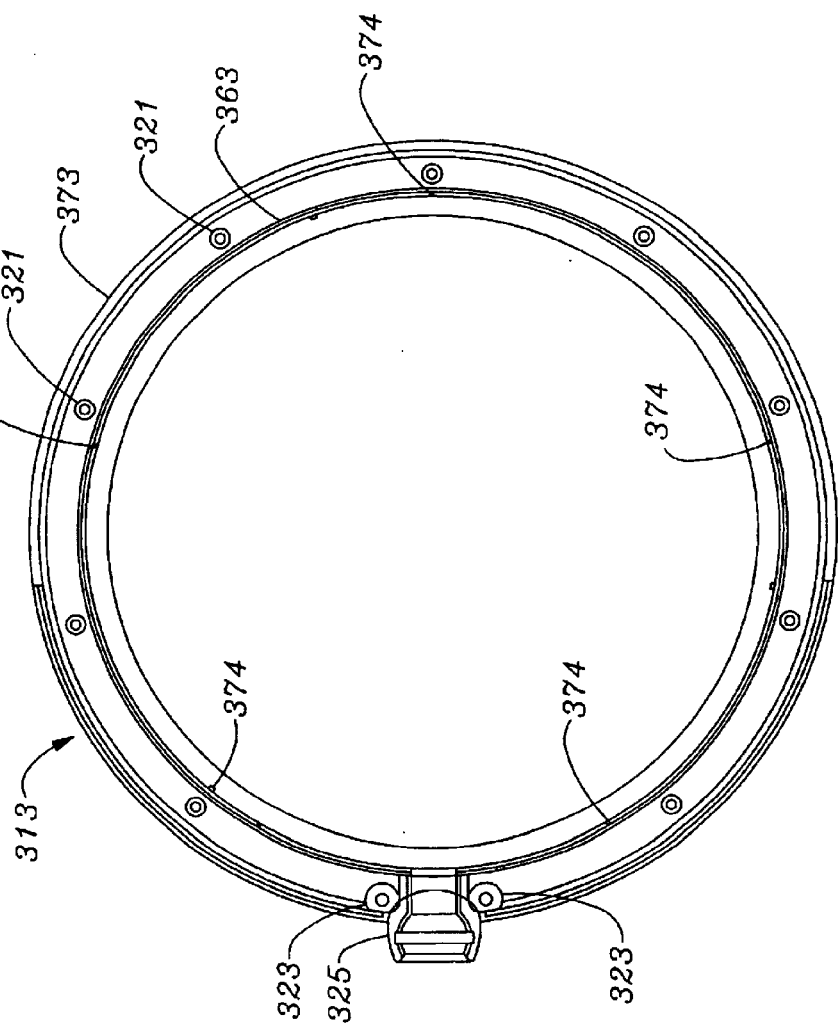

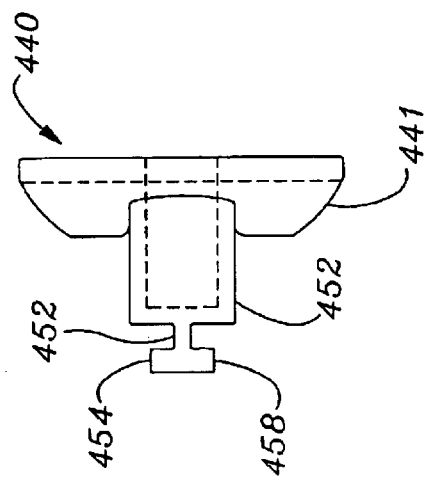
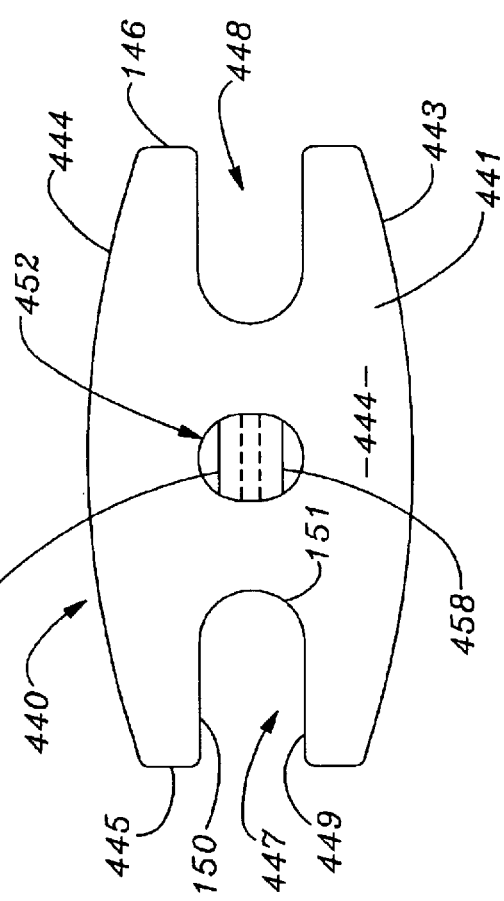
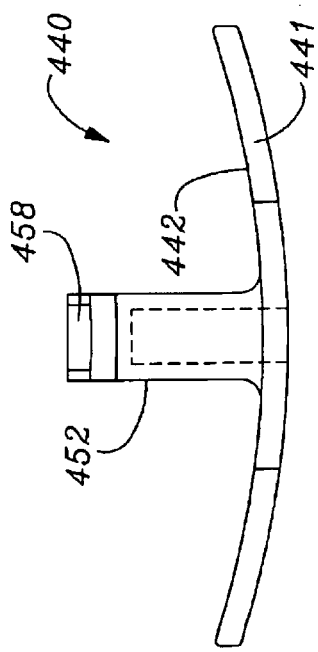

OMNI-DIRECTIONALLY ADJUSTABLE RIGID-ARM FOGLESS SHOWER MIRROR

BACKGROUND OF THE INVENTION

A. Field of the Invention

The present invention relates to mirrors of the type used by people as an aid in performing certain personal grooming tasks such as shaving and the like. More particularly, the invention relates to a novel mirror device which includes an adapter which is readily attached between an existing shower pipe or arm and shower nozzle, the device including a fogless mirror located at the end of rigid arm adjustably fastened to the adapter and adjustable at any desired position relative to the shower arm, thus enabling a person standing in a shower enclosure to omni-directionally adjust the mirror and obtain a clear, fogless, condensation-free image of himself or herself, in spite of the high humidity produced by warm or hot water issuing from the shower nozzle.

B. Description of Background Art

A substantial number of people utilize mirrors while showering to facilitate performance of personal care functions such as shaving. However, the use of mirrors in showers was formerly relatively limited, because the warm moist air within a shower enclosure tends to quickly condense on the surface of any mirror used in the shower, obscuring an image of a person's face reflected from the mirror surface so completely as to render the mirror practically useless within a few minutes after a shower has begun.

In response to the problem of moisture condensing on a mirror surface and thereby limiting the usefulness of mirrors in high humidity environments, such as shower enclosures and other locations within a bathroom, the present inventor disclosed in U.S. Pat. No. 4,733,468, issued Mar. 29, 1988, a "fogless" mirror which is highly resistant to formation of condensation droplets on the surface of the mirror. The fogless mirror disclosed in the '468 patent utilizes warm water tapped from the warm water supply pipe to a shower head, to heat the surface of the mirror. Since water vapor in a shower produced largely by evaporation, the water vapor is always somewhat cooler than the warm water supplied to the shower head. And, since water vapor will condense only on surfaces which are at lower temperature than the vapor, heating the surface of the mirror precludes fogging of the mirror. Therefore, the fogless mirror disclosed in the present inventor's '468 patent proved to be a highly effective solution to the problem of bathroom mirror fogging, and mirrors utilizing the teachings of that patent have been widely marketed and used.

U.S. Pat. No. 4,836,668, Christianson, Self-Supported, Adjustable Condensation-Free Shower Mirror, discloses a condensation-free shower mirror which includes a T-joint having at one end an internally threaded part adapted to be screwed onto a shower head, at the other end an externally threaded part adapted to threadingly receive a shower nozzle. A hollow flexible arm protruding from a side of the T-joint has attached to an outer end thereof a mirror assembly which receives a portion of warmer water flowing through the T-fitting from the shower head to the shower nozzle, through a flexible tube contained within the flexible arm. The mirror may be adjusted to a desired position relative to the outlet side of the T-fitting, by bending the flexible arm. However, since the exact angular location of the T-fitting side pipe relative to the longitudinal axis of the fitting is constrained by how tightly the fitting is tightened onto the shower head, the exact polar angle of the flexible arm relative to the longitudinal axis of the shower head is not adjustable by the user. Moreover, for orientations of the mirror laterally outwards of the shower head, relatively large torques are exerted on the flexible arm, which can cause the mirror to droop from its adjusted position.

In view of the limitations of prior art adjustable fogless shower mirrors of the type alluded to above, the present inventor conceived of the present invention.

OBJECTS OF THE INVENTION

An object of the present invention is to provide a fogless shower mirror device which includes an adapter that is readily installable between an existing shower head and shower nozzle, including a mirror assembly which is adjustably coupled to a distal end of a rigid arm adjustably coupled at a proximal end thereof the adapter, whereby the mirror assembly is adjustably positionable relative to the shower head and nozzle.

Another object of the invention is to provide a fogless shower mirror device which includes an adapter assembly which is installable between an existing shower head and shower nozzle, the adapter having a T-coupling including a radially disposed side pipe orbitally adjustable with respect to the longitudinal axis of the shower head, and a secondary right angle or L-coupling including an input leg coextensive with the outlet side pipe of the T-coupling, and an outlet arm perpendicular to the outlet side pipe of the T-coupling which is orbitally adjustable in a plane parallel to the longitudinal axis of the shower arm.

Another object of the invention is to provide an omni-directionally adjustable fogless shower mirror which includes an adapter installable between a shower head and shower nozzle, a side arm member which protrudes radially outward from the adapter and which is orbitally adjustable with respect to the longitudinal axis of the adapter and shower head, an elongated rigid mirror support arm which protrudes perpendicularly from an arm connector union rotatably fitted over the side arm member, the union being orbitally adjustable to thereby locate the end of the mirror support arm at any angular position in a plane parallel to the longitudinal axis of the shower head and adapter, and a mirror assembly adjustably coupled to a distal end of the mirror assembly support arm by means of a ball and socket joint, each of the members having communicating water passageways for conveying a portion of the water flowing through the adapter from the shower head to the shower nozzle to be diverted and thereby flow through the side arm and a hollow mirror assembly support arm into a hollow interior space between an inner surface of a mirror plate and a frame holding the mirror plate, the water exiting the hollow interior space of the frame through a plurality of small orifices in the frame after heating the mirror plate and thereby prevent water from condensing on the surface of the mirror.

Various other objects and advantages of the present invention, and is most novel features, will become apparent to those skilled in the art by perusing the accompanying specification, drawings and claims.

It is to be understood that although the invention disclosed herein is fully capable of achieving the objects and providing the advantages described, the characteristics of the invention described herein are merely illustrative of the preferred embodiments. Accordingly, I do not intend that the scope of my exclusive rights and privileges in the invention be limited to details of the embodiments described. I do intend that equivalents, adaptations and modifications of the invention reasonably inferable from the description contained herein be included within the scope of the invention as defined by the appended claims.

SUMMARY OF THE INVENTION

Briefly stated, the present invention comprehends a mirror device for use by a person in a warm, moist environment typical of that in a shower enclosure, the device including a "fogless" mirror mounted on the end of a rigid arm which is adjustable to any suitable orientation and free of potentially image distorting condensation from forming on the surface of the mirror.

An omni-directionally adjustable rigid-arm fogless mirror device according to the present invention includes a shower head adapter assembly which adjustably supports an arm and mirror assembly, and which is readily installable between an existing shower head and shower nozzle. According to the invention, the adapter assembly includes an adapter tube which has at one end thereof a longitudinally disposed, internally threaded section adapted to threadingly receive the outwardly protruding end of a shower head pipe, and at the other end thereof a longitudinally disposed, externally threaded section adapted to be insertably and threadingly received within the internally threaded rear entrance port of a shower spray nozzle.

The mirror device according to the present invention includes a tubular arm adapter member which has a longitudinally disposed coaxial bore which receives the shower head adapter tube. The arm adapter has a radially outwardly protruding, short boss section and a coaxially located, radially outwardly protruding cylindrically-shaped bushing support arm of smaller diameter which has protruding from an outer end thereof a threaded stud. The arm adapter is rotatable around the shower head adapter tube to position the boss section at a desired polar angle with respect to the longitudinal axis of the shower head adapter tube and securable at the desired position by tightening an adjusting nut threaded onto the externally arm adapter. The angular position of the arm adapter is securely held by the engagement of a plurality of triangular lugs which protrude forward from an enlarged diameter rear boss section of the shower head adapter tube, with a plurality of triangularly-shaped notches formed in a rear annular wall surface of the arm adapter. Thus positioned, an annular groove in the outer surface of the shower head adapter tube, which communicates with a bore through the adapter tube by means of a small orifice disposed radially through the groove, is axially aligned with a small perforation disposed radially through the base of the side arm adapter boss section, between the stud support cylinder and the inner cylindrical wall surface of the boss. Thus, a small portion of water under pressure within the bore of the shower head adapter tube is enabled to flow radially outwardly through the adapter tube orifice, into the annular groove in the outer wall surface of the shower head adapter tube, and thence through the axially aligned perforation in the arm adapter.

The mirror device includes an arm assembly that has an elongated tubular mirror support arm which has at a proximate end thereof a perpendicularly disposed tubular arm connector bushing or union which fits rotatably over the bushing support arm that protrudes radially outwardly from the arm adapter. The arm connector bushing is securable at an adjustable orbital angle around the longitudinal axis of the bushing support arm by a locking knob and lock washer tightened onto a threaded stud protruding from the bushing support arm. Also, the arm connector bushing has a larger internal diameter lower tubular portion which has a lower annular face which rotatably contacts an annular gasket which fits within the bore of the arm adapter boss, and is seated on the face thereof. Since the small radially disposed aperture through the base of the arm adapter boss is radially aligned with the inner bore of the arm connector assembly bushing, water exiting radially outwards through the arm adapter perforation travels radially outwardly between a longitudinally elongated annular space formed between the inner cylindrical wall surface of the arm connector assembly bushing and the outer cylindrical wall surface of the stud support cylinder, and thence into a bore longitudinally disposed through the arm.

Located at the distal end of the mirror support arm is a hollow ball, which fits in a fluid pressure-tight seal within a socket which protrudes radially outwards from a circular mirror frame. The ball has disposed longitudinally therethrough a bore which communicates at an inner end thereof with the bore through the arm, and at the outer end thereof with a bore through the mirror frame socket. The latter communicates at an inner radial end thereof with a hollow lenticular space between a reflective front mirror plate and a circular-shaped frame back plate. Warm water which is conducted from the shower head adapter tube to the interior space behind the mirror plate is expelled through a plurality of small relief holes formed in the rear surface of the mirror frame back plate. Heat transferred from the warm shower head supply to the mirror plate by warm water is sufficient to heat the mirror plate to a temperature which prevents condensation of water upon the mirror plate, thus affording a clear, undistorted image of the user.

BRIEF DESCRIPTION OF THE DRAWINGS

FIG. 6A is a fragmentary longitudinal sectional view of the device of FIG. 1, showing a mirror assembly part thereof.

FIG. 6B is an exploded view of the article of FIG. 6A.

FIG. 7B is a rear, inner elevation view of a front frame component of the mirror assembly of FIG. 6.

FIG. 7C is an end elevation view of the front frame of FIG. 7B.

FIG. 10 is a side elevation view of a shower head adapter tube part of the assembly of FIG. 9.

FIG. 11 is a left end elevation view of the adapter of FIG. 10.

FIG. 12 is a right end elevation view of the adapter of FIG. 10.

FIG. 16 is a right end elevation view of an adjusting nut part of the device of FIG. 1.

FIG. 17 is a longitudinal sectional view of a first modification of the device of FIG. 1, in which a fixed length arm assembly is replaced by a telescopically adjustable arm assembly.

FIG. 18A is a view similar to that of FIG. 17, but showing the telescopic arm thereof fully extended.

FIG. 18B is a view similar to that of FIG. 18A but showing the telescopic arm thereof fully collapsed.

FIG. 19A is a longitudinal sectional view of a second modification of the device of FIG. 1, in which a mirror assembly having a single front mirror plate is replaced by a mirror assembly having front and rear mirror plates of different magnification.

FIG. 19B is an exploded view of the article of FIG. 19A.

FIG. 20A is a rear, inner elevation view of a front frame component of the dual magnification mirror assembly of FIG. 19.

FIG. 20B is an end elevation view of the front frame of FIG. 20A.

FIG. 21A is a front, inner elevation view of a rear frame of the dual magnification mirror assembly of FIG. 19.

FIG. 21B is an end elevation view of the rear frame of FIG. 21A.

FIG. 22 is a front elevation view of a modified razor holder component of the mirror device of FIG. 1.

FIG. 23 is an upper plan view of the razor holder of FIG. 22.

FIG. 24 is a side elevation view of the razor holder of FIG. 23.

DESCRIPTION OF THE PREFERRED EMBODIMENTS

FIGS. 1–16 illustrate a basic embodiment of an omni-directionally adjustable, rigid-arm fogless shower mirror device according to the present invention, while FIGS. 17–24 illustrate modifications of the basic embodiment.

Figure 1:
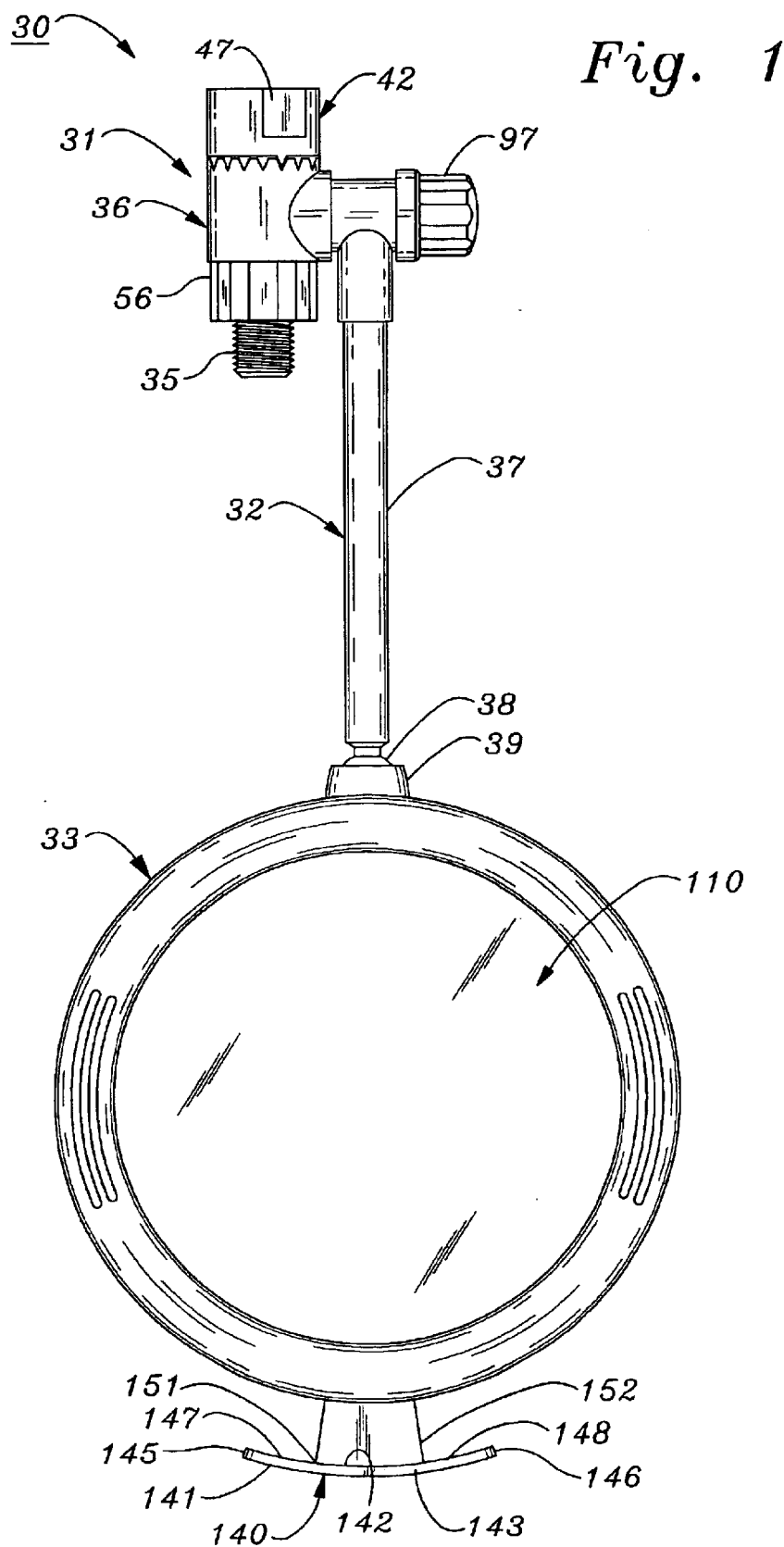
FIG. 1 is a front perspective view of an omni-directionally adjustable rigid-arm fogless shower mirror device according to the present invention.

Referring first to FIG. 1, an omni-directionally adjustable rigid arm fogless shower mirror device 30 according to the present invention may be seen to include a shower head adapter assembly 31, a mirror support arm connector assembly 32, and a mirror assembly 33.

Figure 2A:
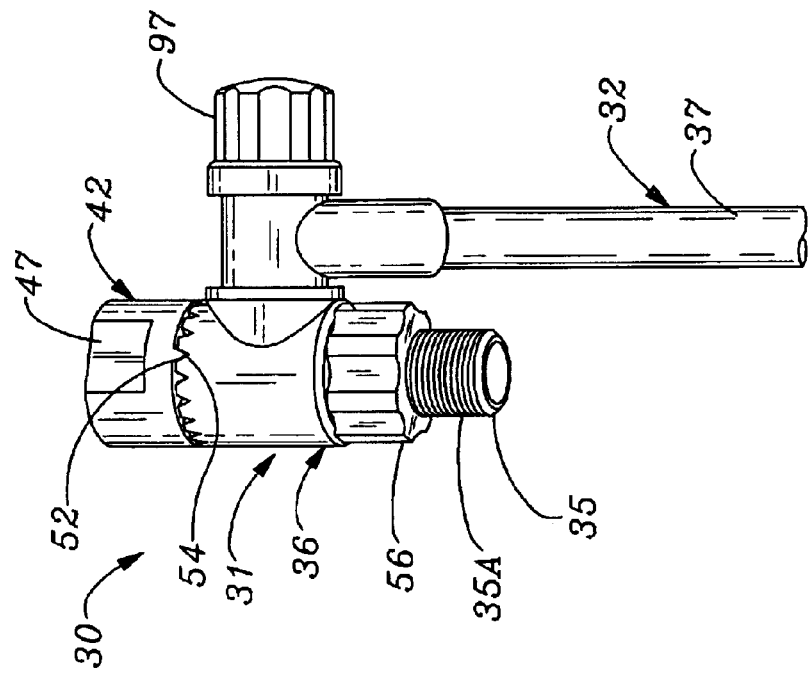
FIG. 2A is a fragmentary perspective view showing the device of FIG. 1 partially fastened to a pipe or shower arm after a shower nozzle originally threaded onto the end of the arm has been removed.
Figure 2B:
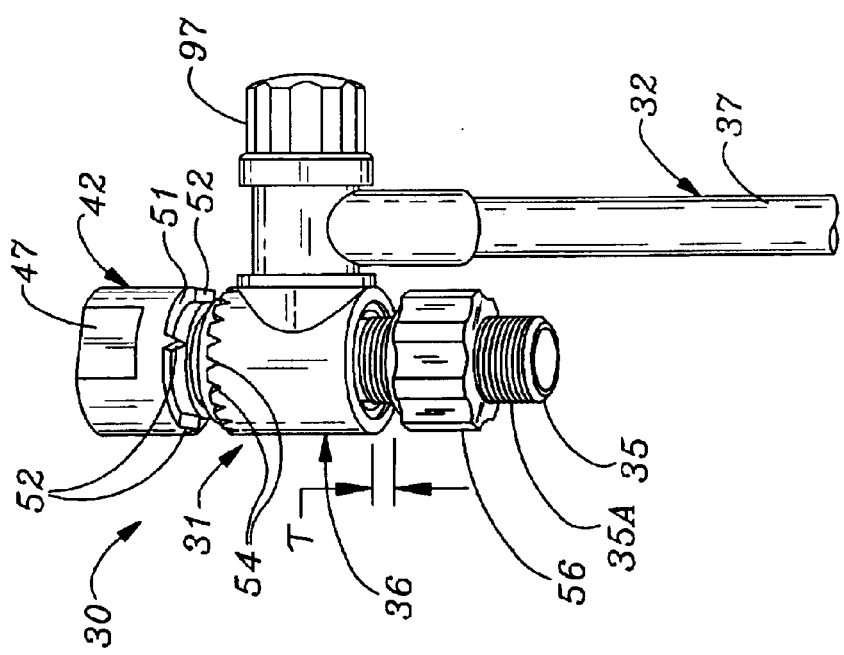
FIG. 2B is a fragmentary perspective view showing the device of FIG. 1 fully fastened onto a shower head.
Figure 2C:
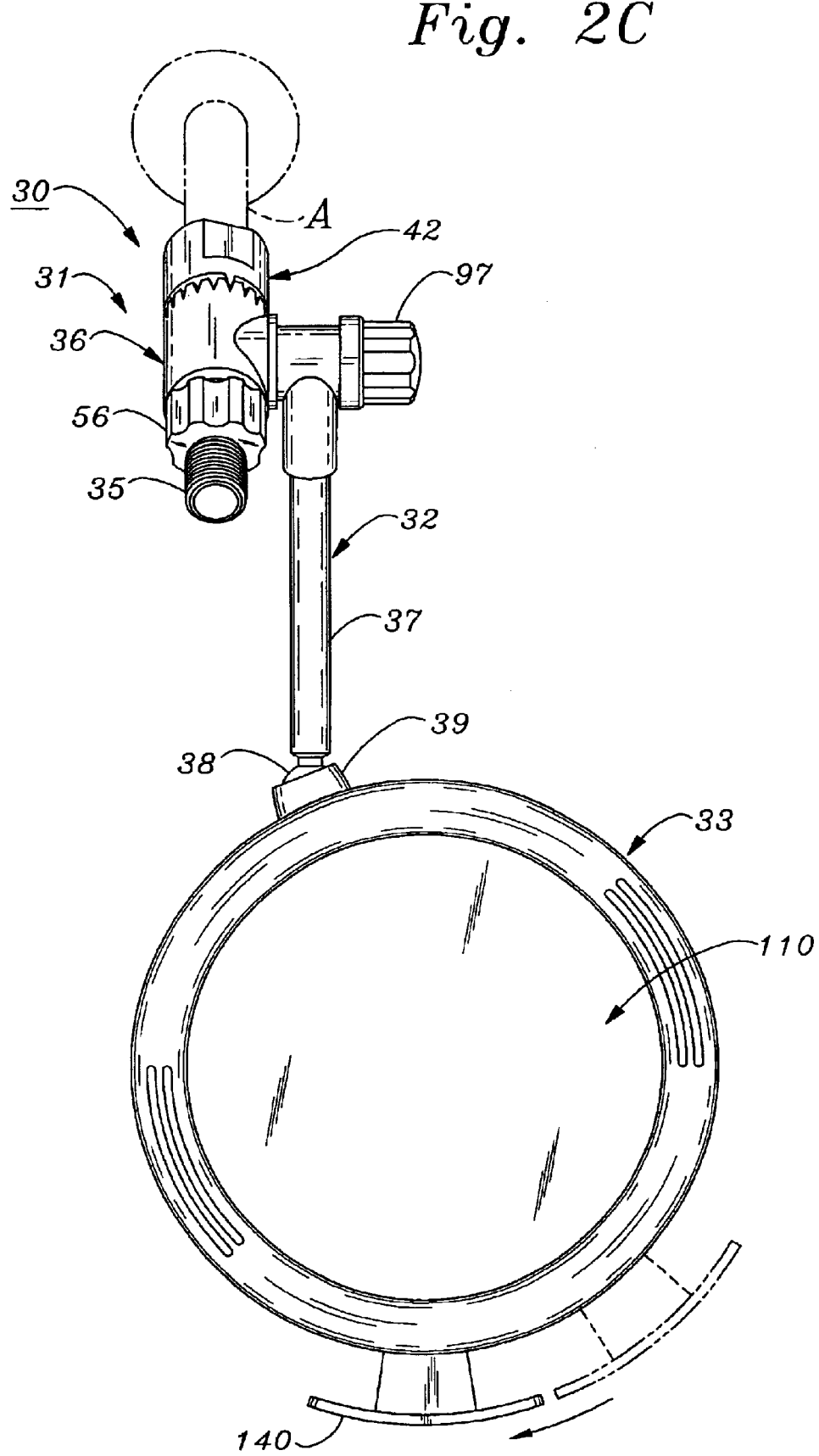
FIG. 2C is a front perspective view of the device and shower head of FIG. 2B.
Figure 3:
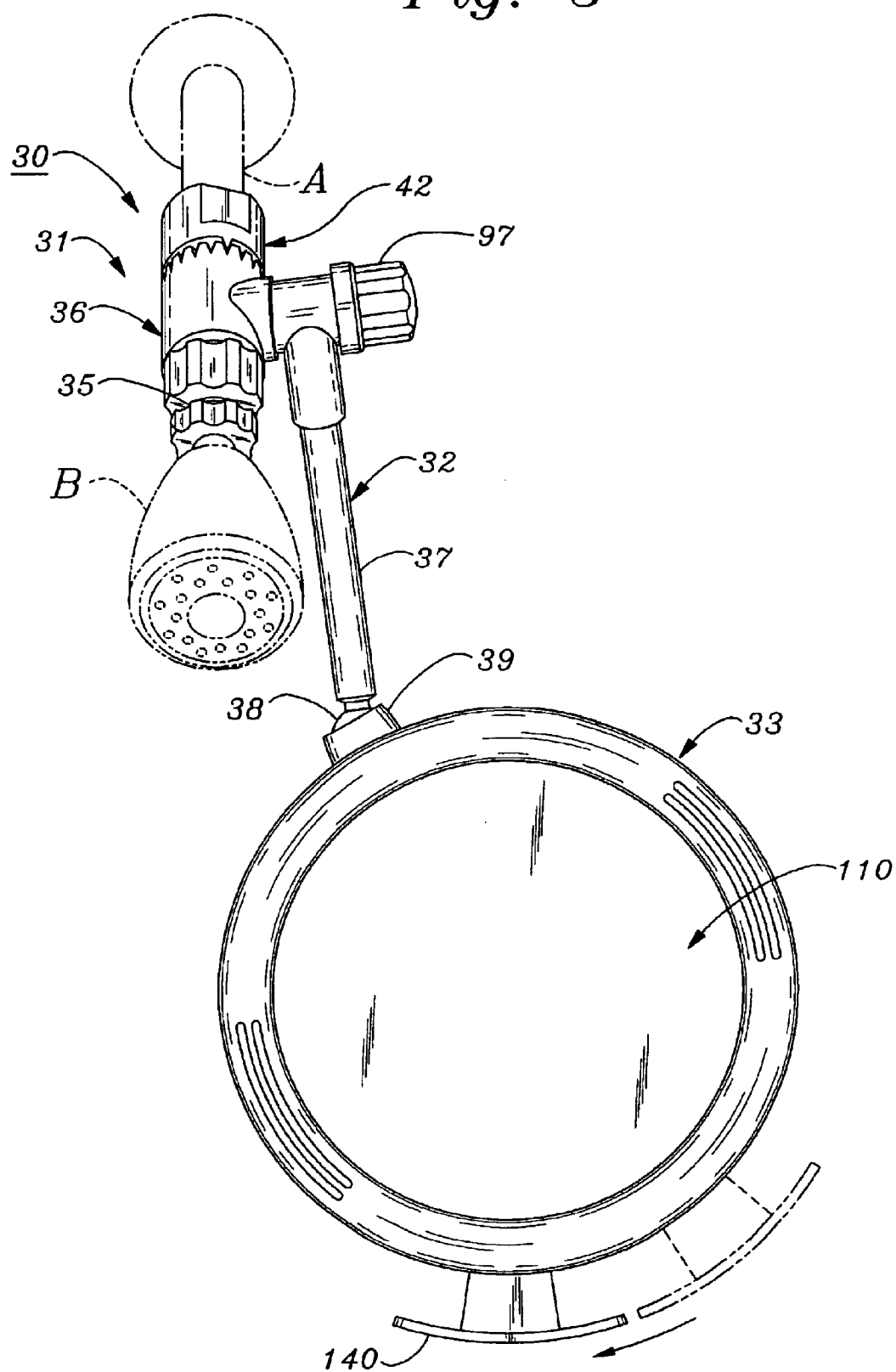
FIG. 3 is a view similar to that of FIG. 2C, but showing a shower nozzle attached to the device to complete installation of the device.

As shown in FIGS. 2A–2C, shower head adapter assembly 31 has a rear portion 34 which is internally threaded, and adapted to be threadingly tightened onto external threads of a shower head pipe or arm. Shower head adapter assembly 31 also has a front portion 35 which is externally threaded and adapted to be threadingly received within the internally threaded bore of a standard shower nozzle. Thus, as shown in FIG. 3, device 30 is readily installed between a shower head and shower nozzle by unthreading the nozzle from the shower head, screwing the shower head adapter assembly 31 onto the shower head, and screwing the shower nozzle onto the shower head adapter.

As may be seen by referring to FIGS. 5 and 9 and described in detail below, shower head adapter assembly 31 includes an arm adapter 36 which has protruding radial outwardly therefrom a bushing support arm 70, that is orbital in a P direction around a Y-axis, coincident with the longitudinal axis of the shower head adapter assembly, and securable thereat. Also, an arm connector bushing 85 fitted rotatably over bushing support arm 70 of adapter 36 is rotatable about the longitudinal axis of the bushing support arm 70, e.g., in direction Q around a Z-axis, as shown in FIG. 5, to thus position a mirror support arm 37 protruding perpendicularly outwards from the arm connector bushing to any orbital angle in a plane parallel to longitudinal axis Y of the shower head adapter assembly.

Figure 4:
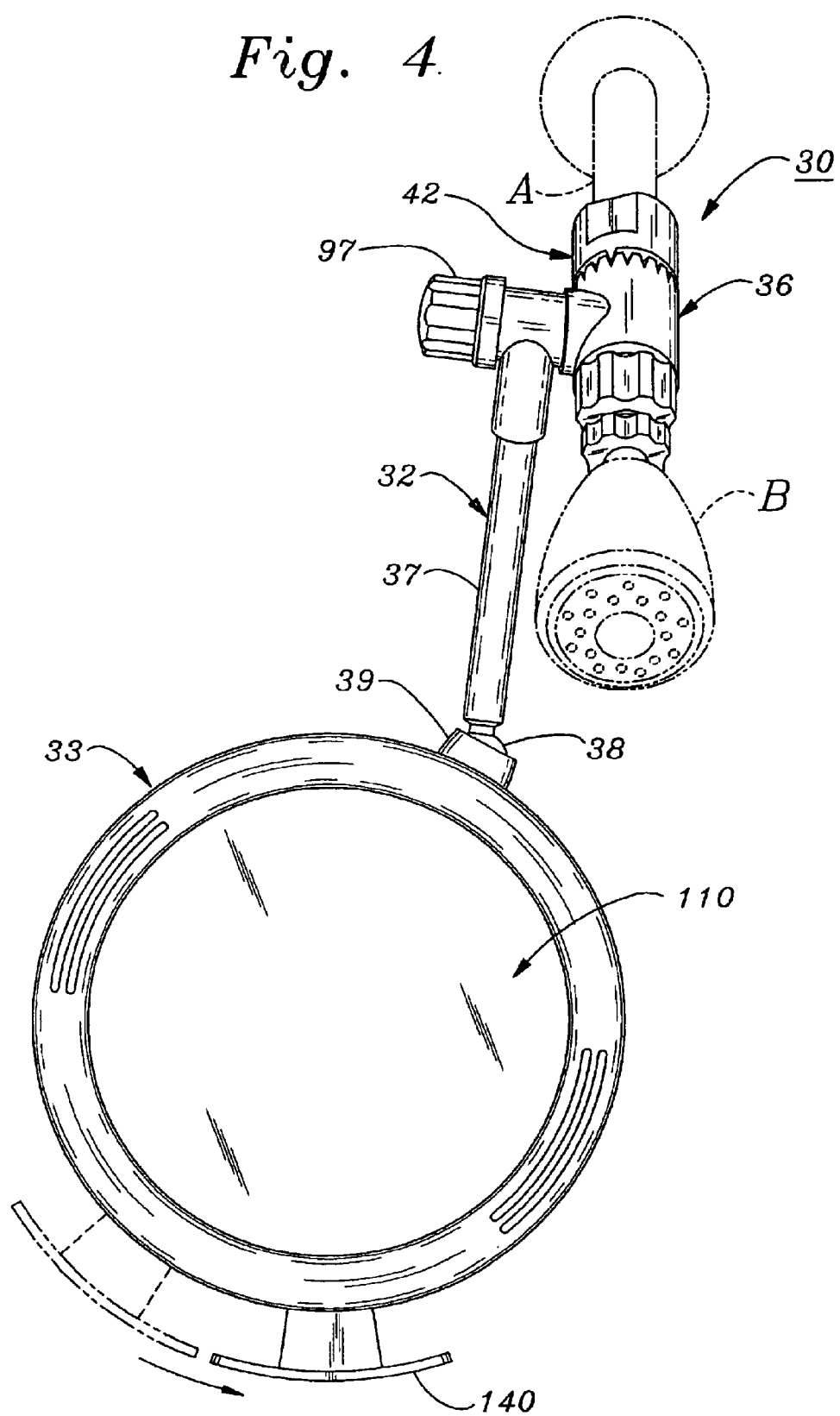
FIG. 4 is a view similar to that of FIG. 3, but showing a mirror of the device orbited clockwise from a location on the right hand side of the shower head to the left hand side thereof.

As shown in FIG. 6A, mirror support arm 37 has at an outer end thereof a ball 38 which is rotatably and frictionally received within a socket 39 which protrudes radially outwards from a circular mirror frame 40 of mirror assembly 33. Socket 39 and mirror frame 40 are pivotable around an X axis in the direction R, rotatable around a Y-axis in the direction S, and pivotable about the Z-axis in the direction T. With the foregoing construction, mirror assembly 33 is adjustable to any polar angle orientation with respect to a shower head, e.g., from a location on the right side of the shower head, as shown in FIGS. 2C and 3, to a location on the left side of the shower head, as shown in FIG. 4. Moreover, as described above, mirror assembly support arm 37 is rotatable about the axis of bushing support arm 70 disposed perpendicularly to the longitudinal axis of the shower head adapter, thus positioning mirror assembly 33 in a fore-and-aft direction forwardly or rearwardly with respect to the shower head. Provided with the foregoing degrees of freedom, mirror assembly 33 is adjustable to any desired position relative to a shower head.

Figure 5:
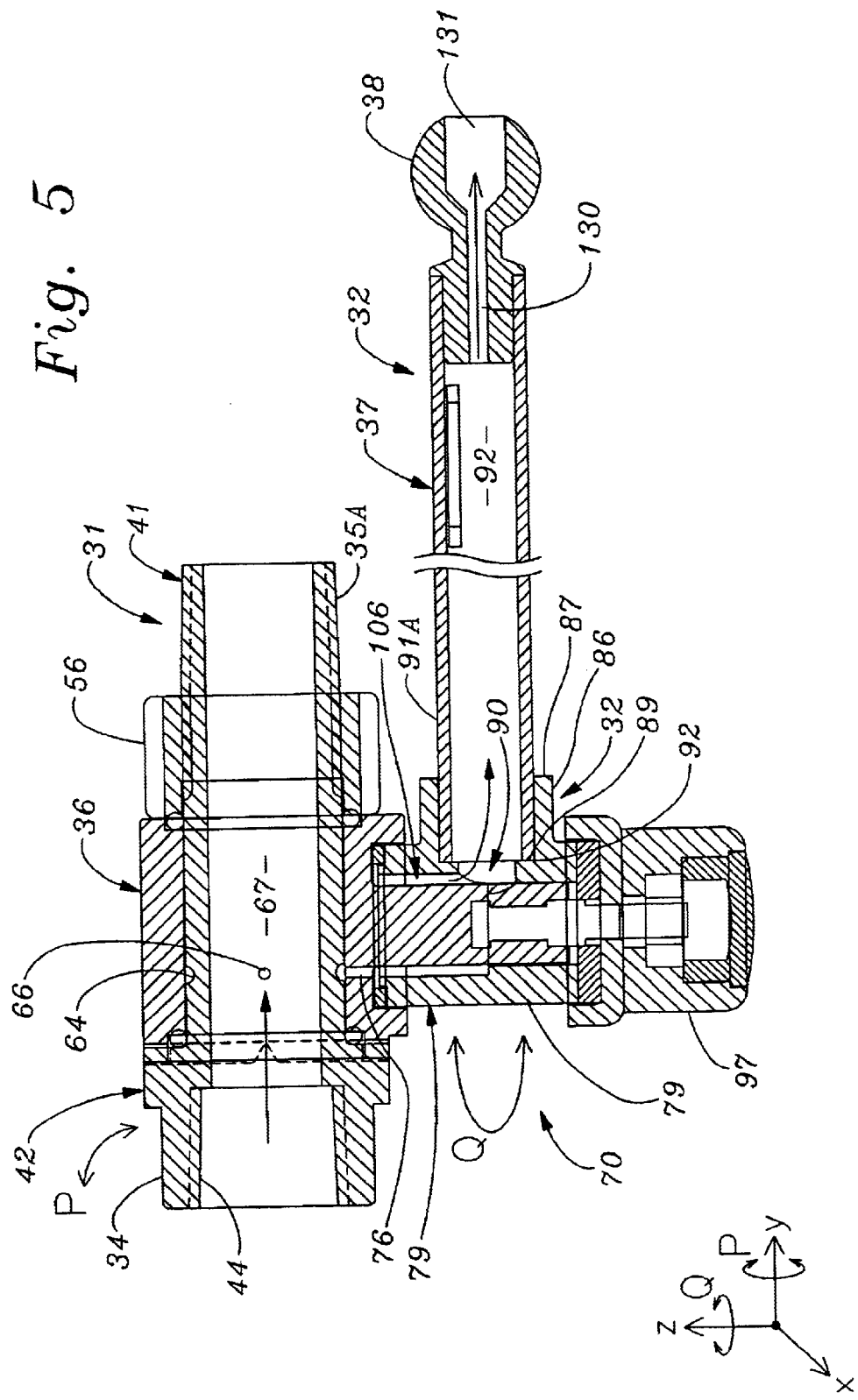
FIG. 5 is a fragmentary longitudinal sectional view of the device of FIG. 1, showing a shower head adapter assembly thereof.
Figure 9:
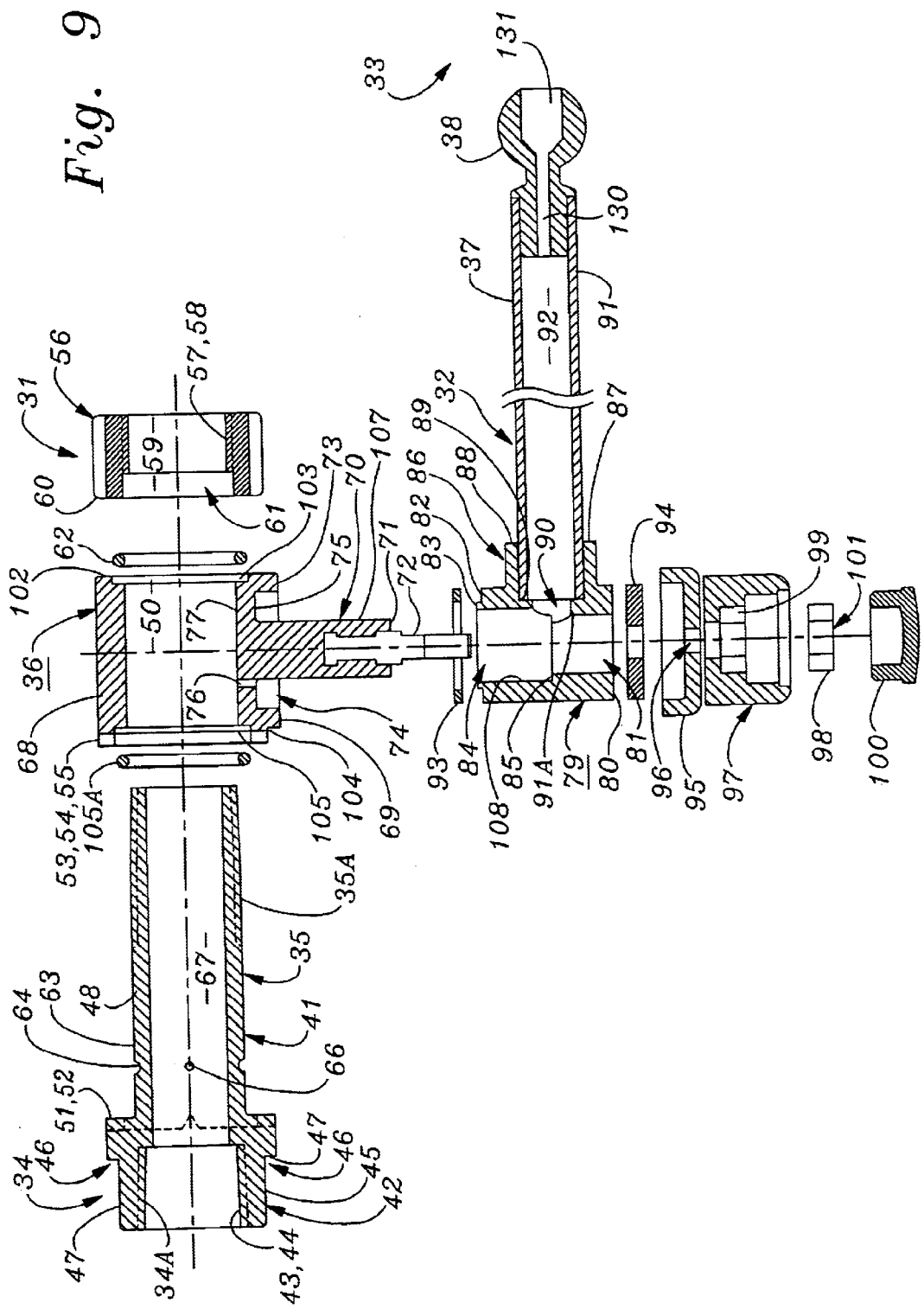
FIG. 9 is an exploded longitudinal sectional view of a shower head adapter assembly of the device of FIG. 1.

Referring now to FIGS. 5 and 9, it may be seen that rear portion 34 of shower head adapter assembly 31 includes a longitudinally elongated, generally cylindrically-shaped tubular body 41 which has located at a first, rear longitudinal end thereof an enlarged diameter boss section 42. Rear boss section 42 has formed in an inner cylindrical wall surface 43 thereof a helical thread 44 which is of the proper size and pitch to threadingly receive an externally threaded outer end portion of a standard shower arm which device 30 is intended to be used with. Preferably, as shown in FIG. 11, boss 42 has formed in an outer cylindrical wall surface 45 thereat a pair of diametrically opposed notches 46 which have longitudinally and transversely disposed, parallel flat base surfaces 47 which comprise a pair of planes adapted to be engagingly received within a pair of opposed flat jaws of a wrench, thus facilitating tightening the adapter tube onto a shower head.

As may be seen best by referring to FIGS. 9 and 10, tubular body 41 of shower head adapter assembly 31 has an intermediate longitudinally elongated portion 48 located between rear boss 42 and front externally threaded portion 35. Intermediate longitudinal portion 48 of tube 41 has a smooth outer cylindrical surface which is of slightly smaller outer diameter than the inner diameter of a smooth cylindrical bore 50 disposed longitudinally through arm adapter 36, thus enabling the arm adapter to rotate freely around tubular body 41.

As may be seen best by referring to FIGS. 10 and 12, boss 42 of tubular body 41 has formed in front annular surface 51 thereof a plurality, preferably four, of circumferentially spaced apart, longitudinally or axially forwardly projecting, triangular elevation view teeth 52. As may be best understood by referring to FIGS. 5, 9, and 14, a rear annular surface 53 of arm adapter 36 has formed therein a plurality of triangularly-shaped, longitudinally or axially forwardly disposed notches 54. Each notch 54 has the general shape of an equilateral triangle, and is circumferentially spaced apart from adjacent notches by a flat, uncut portion 55 of rear annular wall surface 53 that has the same circumferential length as the base of the notches. Although the exact number of notches 54 is not critical, an example embodiment of device 30 utilizes 20 notches.

As shown in FIGS. 5, 9 and 16, shower mirror device 30 includes an adjusting nut 56, which has an inner cylindrical wall surface 57 that contains a helically threaded portion 58 forming a threaded bore 59 which is adapted to threadingly engage front externally threaded portion 35 of shower head adapter assembly tubular body 41. Thus, as shown in FIGS. 2A, 2B and 5, when front surface 51 of boss 42 is pressed axially against rear surface 53 of arm adapter 36 by tightening adjusting nut 56 onto adapter assembly tubular body 41, teeth 52 are pressed into notches 54, thereby enabling the arm adapter to be fixed rotatably on adapter assembly tubular body 41 at any one of 20 equally spaced circumferential intervals, i.e., at 18-degree increments.

As shown in FIG. 9, rear annular wall surface 60 of adjusting nut 56 has cut axially inwardly therefrom a smooth counterbore 61 adapted to receive an O-ring 62, the function of which will be described below.

Referring now to FIGS. 9 and 10, it may be seen that outer cylindrical wall surface 63 of tubular body 41 of shower head assembly 31 has formed therein near the rear end of intermediate portion 48 thereof an annular groove 64. Also, tubular body 41 has formed in cylindrical wall 65 thereof a small radially disposed, circular cross-section orifice 66 which communicates between outer cylindrical wall surface 63 of the tubular body and a coaxial bore 67 disposed longitudinally through the length of the tubular body. The diameter of tube orifice 66 is substantially smaller than that of bore 67 of tubular body 41, e.g., 0.060 inch for a tubular body bore diameter of 0.584 inch.

Figure 15:
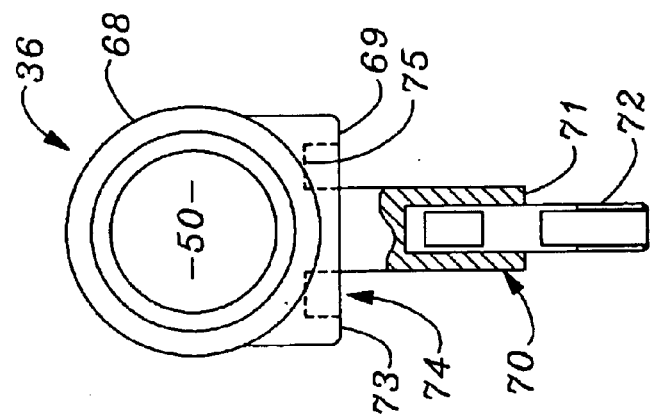
FIG. 15 is a partly sectional right end elevation view of the arm adapter of FIG. 13.
Figure 13:
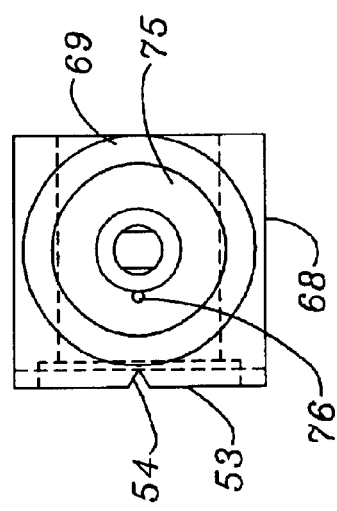
FIG. 13 is a side elevation view of an arm adapter part of the shower head adapter of FIG. 9.
Figure 14:
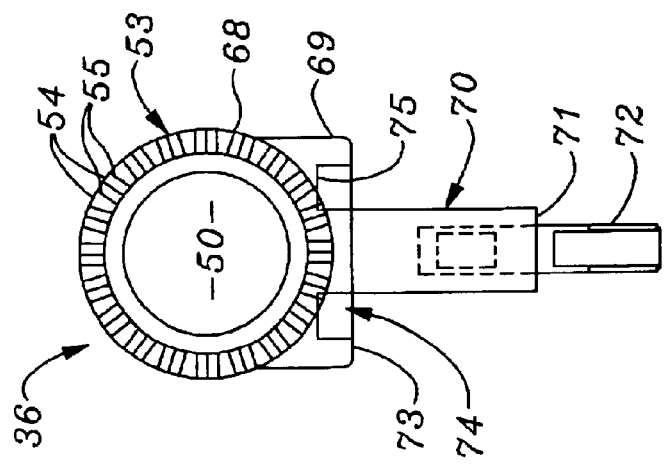
FIG. 14 is a left end elevation view of the arm adapter of FIG. 13.

Referring now to FIGS. 13, 14 and 15 in addition to FIGS. 5 and 9, it may be seen that arm adapter 36 has a longitudinally disposed, a cylindrically-shaped barrel section 68, and radially outwardly projecting from the barrel section a short, circular cross-section connector assembly boss 69 coaxially centered around a smaller diameter cylindrically-shaped bushing support arm 70. Bushing support arm 70 has protruding longitudinally outwardly from an outer transverse face 71 thereof a coaxially centered, threaded stud 72.

As shown in FIG. 9, connector assembly boss 69 has protruding longitudinally inwards from outer transverse face 73 thereof an axially elongated, concentric annular groove 74. Groove 74 has a flat, transversely disposed annular ring-shaped base 75 which coaxially encircles bushing support arm 70. Base 75 of annular groove 74 has formed through its thickness dimension a radially disposed perforation 76 which penetrates cylindrical wall 77 of barrel section 68 of arm adapter 36 into a cylindrical bore 50 disposed longitudinally through the barrel section. Preferably, perforation 76 has the same diameter as that of tube orifice 66, e.g., 0.060 inch.

As may be seen best by referring to FIGS. 5 and 9, bushing support arm 70 which protrudes radially outwards from barrel section 68 of arm adapter 36 rotatably supports mirror support arm connector assembly 32, in a manner which will now be described.

As shown in FIGS. 5 and 9, mirror support arm connector assembly 32 includes a generally cylindrically-shaped arm connector bushing or barrel section 79. Barrel section 79 has protruding longitudinally inwardly from outer transverse face 80 thereof an outer bore 81 which has a slightly larger diameter than the outer diameter of bushing support arm 70, which is rotatably received within the outer barrel bore. Also, barrel section 79 of arm connector assembly 32 has formed in inner transverse face 82 thereof a longitudinally outwardly protruding annular flange 83 in which is formed an inner longitudinally disposed bore 84. Inner bore 84 has a larger diameter than outer bore 81, is coaxially aligned therewith, and joins the outer bore about midway through the length of barrel section 79, forming therewith an annular ring-shaped joint flange 85.

Referring still to FIGS. 5 and 9, it may be seen that mirror support arm connector assembly 32 includes a cylindrical boss section 86 which protrudes radially outwards from barrel section 79 of the connector assembly. Boss section 86 has protruding longitudinally inwardly from outer transverse face 87 thereof a cylindrical bore 88, which has a longitudinally inwardly located, annular ring-shaped base 89 in which is formed an inner bore 90 of smaller diameter than outer bore 88. Outer bore 88 is adapted to receive in a relatively tight fit the outer cylindrical wall surface 91 of tubular mirror support arm 37, which has an inner transverse face 91A which seats on annular base 89 of bore 88. Mirror support arm 37 has a bore 92 which communicates with inner bore 90 of mirror support arm boss section 86, and is permanently fastened in a fluid pressure-tight seal within outer bore 88 of the boss section by any convenient means such as adhesive bonding or welding.

As shown in FIGS. 5 and 9, barrel section 79 of mirror support arm connector assembly 32 is rotatably secured to bushing support arm 70 of arm adapter 36, as follows. A resilient gasket washer 93 is placed coaxially over bushing support arm 70, and pushed axially inwardly over the bushing support arm to seat on annular ring-shaped base 75 at the bottom of annular groove 74 in connector assembly boss 69 of arm adapter 36. Bushing support arm 70 of arm adapter 36 is then inserted into rear inner bore 84 of arm connector assembly barrel section 79, and moved axially outward until longitudinally outwardly protruding annular flange 83 of barrel section 79 seats on the outer, upper surface of gasket washer 93. An outer resilient gasket washer 94 is then slipped over stud 72 protruding radially outwardly of outer transverse face 80 of arm connector assembly barrel section 79, and a cup-shaped rigid lock washer 95 is fitted over the outer transverse face of arm assembly barrel section 79 by inserting the outer end of stud 72 through a central coaxial perforation or bore 96 through the lock washer. Finally, an adjusting knob 97 which contains a coaxially located hex nut 98 within a cavity 99 inside the knob, the cavity being sealed by a plug 100, is tightened onto stud 72 by threadingly engaging the stud within a threaded bore 101 through the nut, thus securing mirror support arm 37 at any selected azimuth angle within a 360 degree circle centered on the longitudinal axis of bushing support arm 70.

Arm adapter 36 of shower head adapter 31 is rotatably secured to tube 41 of the shower adapter, as follows.

As shown in FIG. 9, barrel section 68 of arm adapter 36 has formed in front transverse face 102 thereof a front counterbore 103 for receiving a front O-ring 62. Similarly, rear transverse face 104 of arm adapter 36 has formed thereat a rear counterbore 105 for receiving a rear O-ring 105A. Barrel 68 of arm adapter 36 is secured to tubular body 41 of shower adapter at an adjustable azimuth angle of bushing support arm 70 with respect to the longitudinal axis of bore 67 through tubular body 41 of shower head adapter 31, by tightening adjusting nut 56 onto externally threaded front portion 35 of the tubular body, as has been previously described.

With the above-described components of device 30 fitted together as shown in FIGS. 5 and 9 and described above, a small portion of flowing warm water supplied to bore 67 of shower head adapter tube from a shower head and conducted therethrough to a shower nozzle is diverted into bore 92 of mirror support arm 37, by the following path, indicated by arrows in FIG. 5: Radially outwardly through shower head adapter tubular body orifice 66 into groove 64 in the outer cylindrical wall surface of shower head adapter tubular body 41, circumferentially within groove 64 to perforation 76 in base 75 of arm adapter boss 69, radially outwardly through perforation 76 into annular space 106 between the outer cylindrical wall surface 107 of bushing support arm 70 and the cylindrical wall surface 108 of larger, inner radial bore 84 in barrel section 79 of support arm adapter connector assembly 32; and axially outwardly through bore 90 in barrel section 79 of the connector assembly into bore 92 of mirror support arm 37. The construction of mirror assembly 33, and the manner of conducting warm water from bore 92 into contact with a mirror held within the mirror assembly, to thereby warm the mirror and prevent condensation fogging thereof, will now be described.

Referring now to FIGS. 1, 2A–2C, 6A–6B, 7A, 7B, and 8A and 8B, it may be seen that mirror assembly 33 includes a flat circular mirror 110 having a reflective surface 111. Preferably, mirror 110 is made of glass, the rear surface 111 of which is reflective. Optionally, flat mirror 110 is replaced by a magnifying mirror 110A having a concave reflecting surface 111A. Mirror 110 is held between a front annular ring-shaped bezel frame 112 and a circular disk-shaped rear or back frame 113 which has a convex, arcuately curved rear surface 114. As shown in FIGS. 6A and 6B, rear frame 113 has over a major portion of its area a uniform thickness. Thus, rear mirror frame 113 has a concave front surface 115 which forms with rear surface 111 of mirror 110 a hollow, lenticular-shaped interior space or plenum 116. As shown in the figures, mirror 110 is seated on the upper surface 118 of annular ledge 117 which protrudes forward from back frame 113 near the outer peripheral edge of the back frame, and is retained thereat by an annular bezel flange or lip 119 which protrudes rearwardly from front frame 112. Front and rear frames 112, 113 are secured together by means of interlocking pins 120 and recesses 121, and by screws 122 threaded within bosses 123.

As shown in FIGS. 6A, 6B, 7A, 7B, and 8A, 8B, front and rear frames 112, 113 have protruding radially outwardly therefrom front and rear, generally hemispherically-shaped socket halves 124, 125, respectively. Socket halves 124, 125 have formed therein generally hemispherically-shaped concave cavities 126, 127 which depend inwardly from flat, mid-plane mating inner surfaces 126A, 127A, respectively, of front and rear frames 112, 113. Thus, when front and rear frames 112 and 113 are fastened together as shown in FIGS. 6A and 6B, confronting concave cavities 126, 127 of socket halves 124 125 form therebetween a generally spherically-shaped socket 39 which clampingly receives ball 38 at the outer end of mirror assembly support arm 37. Socket 39 has disposed radially inwardly therefrom a passageway 129 which communicates with plenum 116 rearward of mirror 110. Also, ball end 38 of mirror assembly support arm 37 has disposed longitudinally or axially therethrough an outer bore 130 which communicates at an outer radial end thereof with bore 92 through mirror assembly support arm 37, and at an inner radial end thereof with an enlarged diameter, inner bore 131 of larger diameter than the outer bore. Inner bore 131 of ball 38 communicates with an enlarged diameter outlet bore 132 formed in socket 39, and outlet bore 132 communicates with passageway 129 to plenum 118. Thus, warm water conveyed through bore 92 of mirror support arm 37 is conducted into outlet bore 132 of socket 39, for arbitrary rotation relative angles between socket 39 and ball 38, thus ensuring that warm water flow is enabled to flow from bore 92 into mirror assembly plenum 116 for such arbitrary relative orientations.

As shown in FIG. 6B, inner facing surfaces 126A, 127A of socket halves 124, 125, have formed therein upper and lower transversely disposed semi-circularly-shaped, rectangular cross-section grooves, 135, 136, respectively. When front and rear frame 112, 113 are fastened together, as shown in FIG. 6A, semi-circular grooves 135, 136 form an annular ring-shaped groove 137 in which is fitted a resilient flat annular ring-shaped sealing washer 138 that forms a watertight seal between socket 39 and ball 38.

Figure 8A:
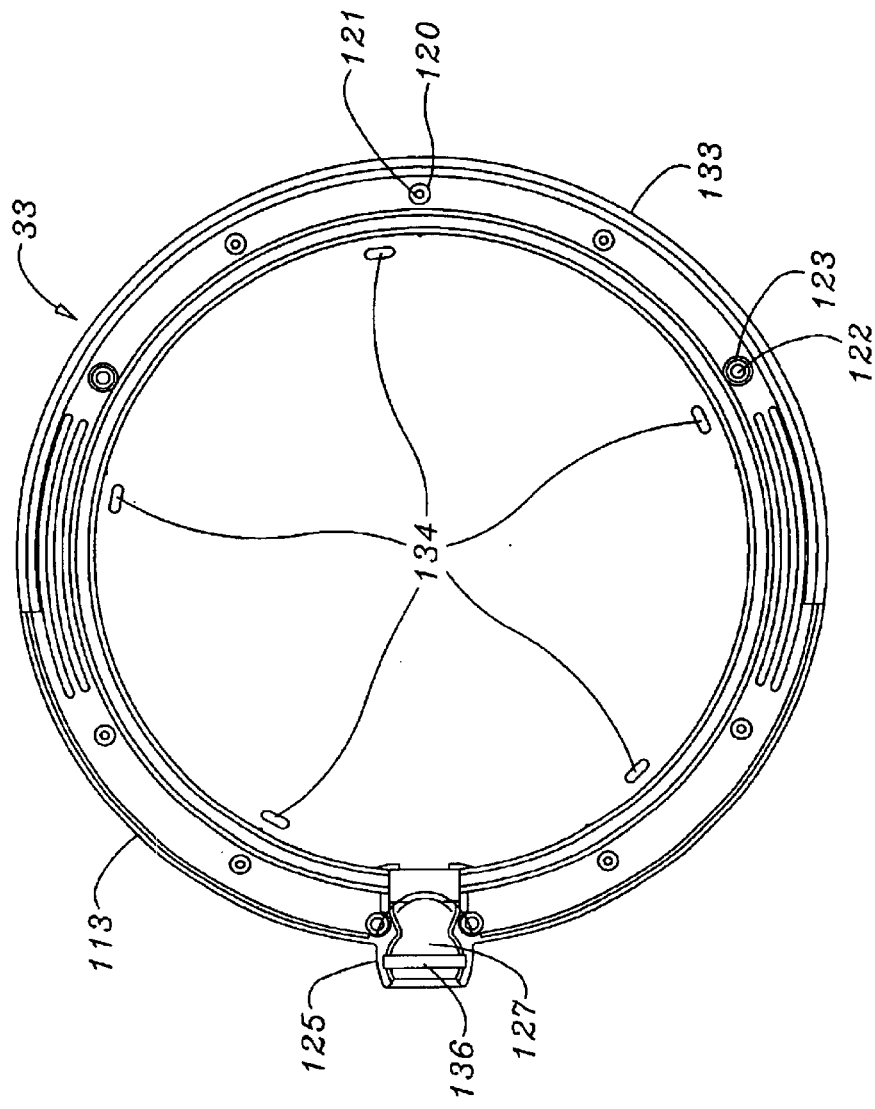
FIG. 8A is a front, inner elevation view of a rear frame component of the mirror assembly of FIG. 6, showing water outlet holes of the mirror assembly.
Figure 8B:
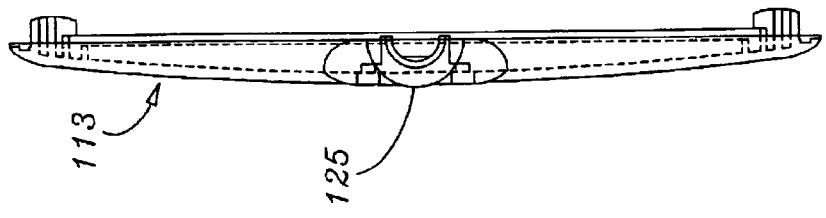
FIG. 8B is an end elevation view of the rear frame of FIG. 8A.

As shown in FIG. 8A, back frame 113 of mirror assembly 33 has located on a circle near the outer circumferential edge wall 133 of the back frame a plurality, e.g., five, of circumferentially elongated water, oval-shaped relief orifices 134, for enabling water which has been introduced into plenum 116 and cooled by warming contact with mirror 110, to exit the plenum, allowing a fresh supply of warm water to enter the plenum.

As may be seen best by referring to FIGS. 1–4, 6A, 6B and 7A, 7B, mirror device 30 according to the present invention preferably includes a razor holder bracket 140 which is orbitally mounted to mirror assembly 33. Razor holder bracket 140 includes an arcuately curved shelf 141 which has a concavely curved upper surface 142; convexly curved front and rear edge walls 143, 144 and straight left and right side edge walls 145, 146. The latter have protruding laterally inwardly therefrom left and right razor handle support slots 147, 148, respectively, which have parallel front and rear laterally disposed edge walls 149, 150 and a concave, arcuately curved inner longitudinally disposed edge wall 151.

Figure 7A:
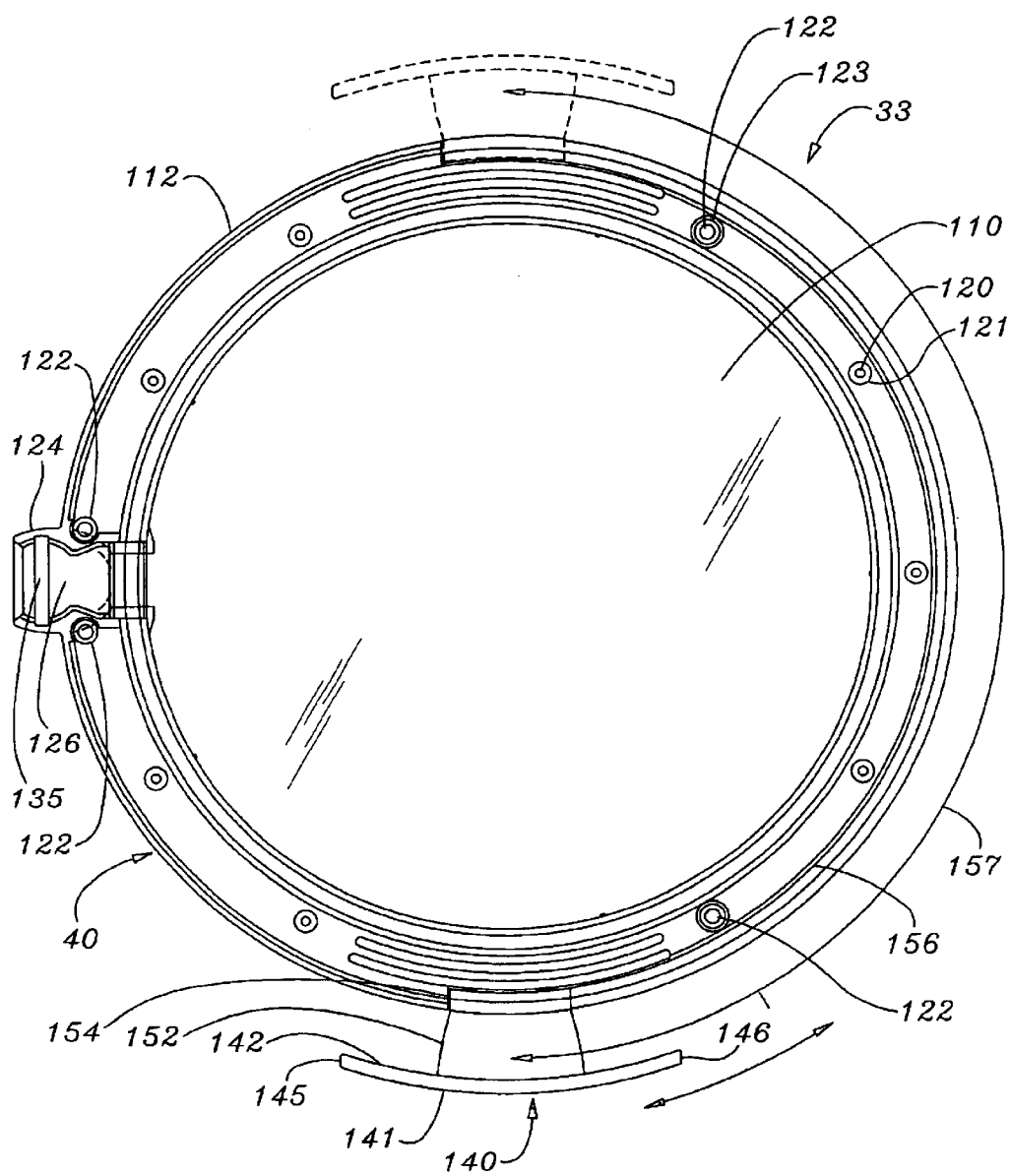
FIG. 7A is a front view of the mirror assembly of FIG. 6.

Razor holder bracket 140 has protruding perpendicularly upwardly from rear edge wall 144 thereof a generally trapezoidally-shaped attachment plate tab 152 which has an arcuately curved, concave upper edge wall 153, the latter having a thin curved rib 154 of the same shape which protrudes rearwardly from rear surface 155 of the attachment plate. As shown in FIGS. 6A, 6B, and 7A, rib 154 is circumferentially slidably held in a semi-circularly-shaped groove 156 formed between front and rear mirror frames 112, 113, near the outer peripheral edge 157 of the mirror frame assembly 33.

A modified razor bracket 440 is shown in FIGS. 22–24, in which attachment plate 152 is replaced by a centrally located pedestal 452 which has a pair of rearwardly and forwardly protruding ribs 454, 458 for engaging mirror frame groove 156.

As shown in FIG. 7A, groove 156 is located on a side of mirror frame assembly opposite socket 39, thus enabling razor holder bracket 140 to be orbitally adjusted to any desired position over the 180 degree range indicated by solid and dashed views of the bracket shown in FIG. 7A. This arrangement ensures that the razor holder bracket may be adjusted to a pendant position below mirror assembly 33, for a wide range of orientations of the mirror assembly.

FIG. 17 illustrates a first modification of a omnidirectionally adjustable rigid arm fogless shower mirror device 30 according to the present invention. Modified device 230 is identical in every respect to basic embodiment 30 described above, except for the replacement of fixed length mirror support arm 37 by a telescopically adjustable arm 237. The latter includes a radially inwardly located, larger diameter outer tubular section 237A, and a radially outwardly located smaller diameter inner tubular section 237B which fits within bore 272 of the outer tubular section and has a bore 292 which is coaxially aligned with and in fluid pressure-tight communication with bore 272. Radially outwardly located extension arm tube 237B has fitted into rear opening of bore 292 therethrough a tubular extension arm stop plug 238 which has an inner cylindrical portion 239 that fits tightly within bore 292, and a radially inwardly located annular flange section 240 which has an outer cylindrical wall surface 241 that fits longitudinally slidably in liquid pressure-tight sealing contact with inner cylindrical wall surface 242 of inner tube portion 237A of arm 237. A sleeve-like connecting nut 243 fits over the outer end of inner arm tube 237A, the connecting nut having a central coaxial bore 244 which longitudinally slidably receives outer arm 237B. Inner tube portion 237A contains at the outer end thereof a cylindrical rubber spacer 245 which has a bore 246 that longitudinally slidably receives outer arm tube 237B, the spacer abutting outer annular flange wall 247 of connecting nut 243. Spacer 245 has an inner annular wall surface 248 which limits radially outward motion of outer tube arm 237B, by abutting contact with outer radial surface 246 of flange portion 247 of arm insert 231. Thus constructed, mirror support arm 237 may be telescopically adjustable from a maximum extension length as shown in FIG. 18A, to a fully collapsed, minimum extension length, as shown in FIG. 18B, as well as to any desired extension length between the minimum and maximum values.

FIGS. 19A, 19B and 21A, 21B, illustrate a second modification 330 of the mirror device 30 according to the present invention, in which mirror assembly 33 having a single mirror plate 110 is replaced by a mirror assembly 333 having a concave front mirror plate 310 having a first magnification, e.g., 3× and a flat rear mirror plate 310A having a different magnification, e.g., 1×.

Figure 19C:
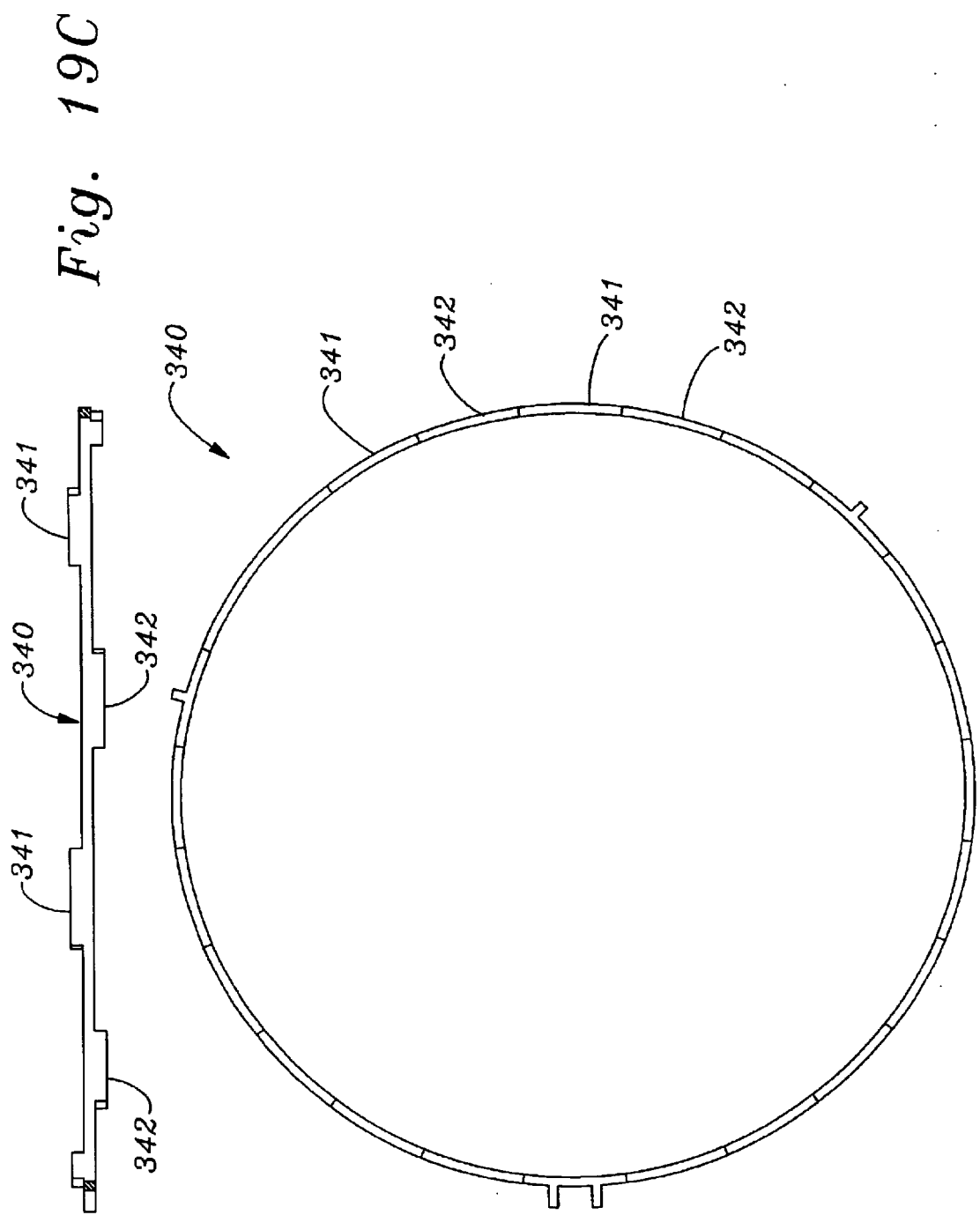
FIG. 19C is an upper plan view of an insert ring component of the mirror assembly of FIG. 19A.

As shown in FIGS. 19A–21B, dual magnification mirror assembly 333 of modified mirror device 330 includes a front annular ring-shaped bezel frame 312 which holds front mirror plate 310, and a similarly shaped rear or back annular ring-shaped bezel frame 313 which holds rear mirror plate 310A. Front and rear mirror plates 310, 310A are held in a spaced apart relationship by a circular ring-shaped spacer ring 340 which, as shown in FIGS. 19A and 19C, has circumferentially spaced apart, alternating forward protruding and rearwardly protruding tabs 341, 342, respectively, thus forming between the rear, inner surface 311 of front mirror 310, and front, inner surface 311A of rear mirror 310A, a lenticular-shaped plenum 316 for receiving warm water from a mirror support arm 37.

As shown in FIG. 20A, front frame 312 of dual mirror assembly 333 of dual mirror device 330 has located in a circular groove 343 located near the outer circumferential edge wall 353 of the front frame a plurality, e.g., five, of circumferentially elongated front water relief orifices 344. Similarly, as shown in FIG. 21A, rear frame 313 has located in a circular groove 363 located near outer circumferential edge wall 373 of the rear frame a plurality, e.g., five of circumferentially elongated, rear water relief orifices 374. Front and rear water relief orifices 344, 374 enable water which has bene introduced into plenum 316 and cooled by warming contact with mirrors 310, 310A to exit from the plenum, allowing a fresh supply of warm water to enter the plenum.

What is claimed is:

1. A mirror device for use in a shower, said device comprising;

a. a shower arm adapter including an elongated tubular body for installation between a shower arm and shower nozzle, said tubular body having disposed therethrough a bore for conveying water from said shower head to said nozzle, b. water diverting means for diverting a portion of water flowing through said bore of said tubular body into a passageway provided through a mirror assembly support arm, c. a mirror assembly support arm having therethrough a passageway which communicates at a first end thereof with said water diverting means and at a second end thereof with an outwardly protruding ball member having therethrough a channel which communicates with said passageway through support arm, and d. a mirror assembly including a mirror in contact with a plenum, said plenum being in fluid-tight communication with a socket which frictionally and adjustably receives in a fluid-tight fit with said ball member, said channel through said ball member having an outlet orifice which communicates through a socket passageway with said plenum for supplying water to said plenum, said socket comprising a pair of mating generally hemispherically-shaped, hollow socket halves which protrude radially outwardly from a pair of front and rear mating mirror frames holding said mirror, each of said socket halves having in an inner surface thereof front and rear longitudinally spaced apart webs which form therebetween a semi-annular ring-shaped cavity, said cavities cooperating to form an annular ring-shaped pocket with said front and rear frame members mated together, said annular ring-shaped pocket holding therewithin a resilient annular ring-shaped gasket washer, said gasket washer having therethrough an aperture circumscribed by a cylindrical inner wall surface which resiliently contacts in fluid-tight contact an outer convex surface of said ball member.

2. A mirror device for use in a shower, said device comprising;

a. a shower arm adapter including an elongated tubular body for installation between a shower arm and shower nozzle, said tubular body having a bore disposed longitudinally therethrough for conveying water from said shower arm to said shower nozzle, b. water diverting means for diverting from said bore within said tubular body of said shower head adapter a portion of water conveyed through said bore, c. a first coupling member having a body rotatably mounted on said tubular body of said shower arm adapter, said coupling member including water passageway means for conveying said diverted portion of water to a first outlet port boss, d. at least a first outlet tube member in communication with said first outlet port boss for conveying said diverted portion of water from said first outlet port boss to a mirror assembly, e. locking means for securing said first coupling member irrotatably to said tubular body of said shower arm adapter with said first outlet tube member oriented at an adjustable azimuth angle relative to a longitudinal axis of said tubular body, f. a mirror assembly connected to said first outlet tube member and including a frame having a hollow interior space in communication with a mirror and water diverted into said first outlet tube member and conveyed to said mirror assembly, said frame including water outlet means for conveying water out from said hollow interior space after contact with said mirror, g. means for connecting said mirror assembly to said first outlet tube member of said first outlet port boss, and h. whereby warm water diverted to said mirror frame assembly is effective in heating said mirror to thereby inhibit water vapor from condensing thereon.

3. The device of claim 2 wherein said water diverting means includes in combination;

a. an annular groove formed in an outer wall surface of said tubular body of shower arm adapter member, b. an orifice disposed radially through said groove into said bore of said tubular body, c. a perforation disposed radially through a longitudinally disposed wall of said first coupling member, said perforation being axially aligned with and in communication with said annular groove in said tubular body of shower arm adapter, and d. whereby water under pressure within said bore of said tubular body of said shower arm adapter is conveyed through said orifice into said annular groove, and thence radially outwardly from said groove through said perforation into said first outlet port and said first outlet tube member for any relative angular orientation of said first port and first outlet tube relative to said longitudinal axis of said tubular shower arm adapter body.

4. The mirror device of claim 2 wherein said locking means for securing said first coupling member to said tubular body of said shower arm adapter comprises in combination;

a. an enlarged diameter shower arm coupler boss fixed to a rear longitudinal end of said tubular body, said boss being coaxial with said bore of said tubular body and having a front annular face which protrudes radially outwardly from an outer longitudinal wall surface of said tubular body, b. a rear annular face on said first coupling member rotatably mounted on said tubular member, c. an adjusting nut threadably attached over an externally threaded portion of said tubular member of said shower head adapter, and d. whereby said adjusting nut is tightenable on a front annular surface of said first coupling member to thereby exert an axially rearward force on said front coupling member relative to said tubular body of shower arm adapter, whereby said rear annular surface of said first coupling member is pressed frictionally against said front annular face of said shower arm coupler boss of said tubular body to thereby inhibit relative rotation between said first coupling member and said boss.

5. The device of claim 4 further including positive locking engagement means for preventing rotation of said coupling member relative to said tubular body of said shower arm adapter when said adjusting nut is tightened onto said first coupling member.

6. The device of claim 5 wherein said positive locking engagement means is further defined as comprising in combination complementary intermeshable surfaces on said front annular surface of said boss and said rear surface of said first coupling member.

7. The device of claim 6 wherein said complementary intermeshable surfaces are further defined as including at least one axially disposed tooth and at least two complementary shaped grooves.

8. The device of claim 7 wherein said complementary intermeshable surfaces are further defined as comprising in combination a plurality of circularly arranged, circumferentially spaced apart protrusions protruding longitudinally outwardly from one of said front annular surface of said boss and said rear annular surface of said first connecting member, and a plurality of circumferentially spaced apart indentations adapted to axially insertable receive said teeth, said indentations protruding longitudinally inwardly into the other of said front annular surface of said boss and said rear annular surface of said first connecting member.

9. The device of claim 2 wherein said means for connecting said mirror assembly to said first outlet tube member of said first port boss is further defined as being a rigid tubular arm.

10. The device of claim 9 further including adjustable fastening means joining said mirror assembly to a distal end of said arm.

11. The device of claim 10 wherein said adjustable fastening means is further defined as being a ball and socket joint.

12. The device of claim 2 wherein said means for connecting said mirror assembly to said first outlet tube member of said first port boss is further defined as comprising in combination;

a. a second rotatable coupling member rotatably coupled to said output port boss of said first coupling member, said second coupling member being rotatable about a central coaxial axis of a cylinder coaxially centered within said first outlet port boss and having a second output port disposed radially outwardly therefrom, b. a tubular mirror assembly support arm having a proximal end which protrudes radially outwardly from and in fluid-tight connection with said second outlet port boss and a distal end in fluid-tight connection with said mirror assembly, and c. adjustable fastening means for securing said second coupling member irrotatably to said first coupling member with said outlet port boss and mirror assembly support arm oriented at a selected compass angle relative to said longitudinal axis of said first outlet port.

13. The device of claim 12 further including a ball and socket joint fastening said distal end of said arm to said mirror assembly.

14. A mirror device for use in a shower, said device comprising;

a. a shower head adapter which includes an elongated tubular body that has at a first, rear longitudinal end thereon an internally threaded section adapted to receive an externally threaded shower head, a second, front, longitudinal end portion having an externally threaded section adapted to be threadingly received within a shower spray nozzle, and an intermediate longitudinal portion located between said front and rear portions of said tubular body, said tubular body having disposed longitudinally therethrough a central coaxial bore, and near said first, rear end thereof an enlarged diameter nut boss which has a front annular surface that protrudes radially outwardly of an outer cylindrical wall surface of said intermediate longitudinal portion of said tubular body, an annular groove formed in said outer cylindrical wall surface of said tubular body forward of said rear nut boss, and an orifice disposed between said groove and said bore of tubular body, b. an arm adapter having a generally cylindrically-shaped barrel section which fits rotatably over said intermediate longitudinal portion of said tubular body of said shower head adapter, said barrel section having protruding radially outwardly therefrom a first, hollow cylindrically-shaped outlet port boss, and, centered coaxially therewithin, a radially outwardly protruding bushing support arm, said first outlet port boss having a radially inwardly located annular base wall through which is formed an aperture longitudinally aligned and in communication with said annular groove in said tubular body of said shower head adapter, c. locking means for securing said arm adapter irrotatably to said tubular body of said shower head adapter with said bushing support arm oriented at an adjustable polar angle relative to a longitudinal axis of said tubular body, d. an arm support connector adapter which has a generally cylindrical barrel-shaped bushing which fits rotatably over said bushing support arm, said bushing having disposed radially outwardly from a longitudinal axis common to said bushing and bushing support arm a hollow tubular arm support boss having therethrough a radially disposed bore which communicates with a longitudinally disposed bore through said bushing, e. adjusting knob means for securing said arm support connector adapter bushing to said arm adapter outlet boss in fluid-tight connection with said arm support boss at an adjustable compass angle relative to said longitudinal axis of said bushing, whereby a portion of water flowing through said tubular shower head adapter is diverted through said orifice into said annular groove in said annular member, and conveyed through said aperture located in said base of said first outlet port arm into a hollow annular space between said bushing support arm and an inner cylindrical wall surface of said bushing to thence outlet through said arm support boss, f. an elongated hollow tubular mirror assembly support arm protruding axially outward from said arm support bushing, said support arm having through its length a bore which is in fluid-tight communication with said bore of said arm support boss, g. a mirror assembly including a frame which holds a reflective mirror, said frame having therewithin a plenum which communicates with an inlet port fitting and an inner surface of said mirror, and with water relief port means through said frame, and h. coupling means for coupling in fluid-tight connection said inlet port of said mirror and a distal end of said mirror assembly support arm, whereby warm water diverted from said shower head to said mirror support arm is conveyed to said plenum to thereby contact and warm said mirror and thereby inhibit condensation of water vapor on the outer surface thereof, said water then exiting from said plenum through said water relief holes.

15. The mirror device of claim 14 wherein said mirror support arm is further defined as being rigid.

16. The mirror device of claim 14 wherein said mirror support arm is further defined as having a telescopically adjustable length.

17. The mirror device of claim 14 wherein said coupling means for coupling said mirror support arm to said mirror assembly is further defined as being a ball and socket joint including a ball which has therethrough a water channel which communicates with a water channel through said socket into said plenum.

18. A fogless shower mirror device for use in showers, said device comprising, a. a shower arm adapter including an elongated tubular body for installation between a shower arm and a shower nozzle, said tubular body having disposed longitudinally therethrough a bore for conveying water from said shower head to said nozzle, and an orifice disposed radially through said tubular body for diverting a portion of water flowing through said bore of said tubular body radially outwardly from said bore, b. a first fluid-transmissible rotatable coupler mounted coaxially on said tubular body of said shower arm adapter, said first rotatable coupler having protruding radially and outwardly therefrom a first outlet port boss in fluid-tight communication with said orifice and orbitally adjustable with respect to a first rotation axis parallel to a longitudinal axis or said tubular body of said shower arm adapter over an azimuth angle range of substantially 360 degrees, c. a rigid tubular mirror assembly support arm connected t o said first outlet port boss, said arm having therethrough an elongated through-passageway which connects at a first end thereof in fluid-tight communication with said first outlet port boss and at a second end thereof with a support arm outlet passageway, and d. a mirror assembly including a mirror support frame which supports a mirror in contact with a hollow interior space within said frame, said interior space being in fluid-tight connection with said support arm outlet passageway, whereby said mirror is heatable by said portion of water diverted from said shower arm adapter bore and conveyed to said hollow interior space of said mirror support frame to thereby inhibit condensation fogging of a reflective surface of said mirror, and whereby said support arm is orbitally adjustable over substantially a 360-degree azimuth angle range with respect to said longitudinal axis of said tubular shower arm adapter to position said mirror assembly at an adjustable orbital position relative to said shower arm adapter.

19. The mirror device of claim 18 wherein said mirror frame has therethrough at least one water outlet relief hole which communicates with said hollow interior space of said frame to enable water flow through said hollow interior space within said frame.

20. The mirror device of claim 18 further including a second fluid transmissible rotatable coupler rotatably mounted to said first outlet port boss of said first rotatable coupler, said second rotatable coupler being connected between said first rotatable coupler and said rigid support arm and having a second rotation axis inclined to said first rotation axis of said first rotatable coupler, thereby enabling rotatable adjustment of said mirror assembly support arm with respect to said second rotation axis.

21. The mirror device of claim 20 further including a third fluid-transmissible rotatable coupler mounted between said outlet end of said support arm and said mirror frame, said third rotatable coupler enabling adjustable motion of said mirror frame relative to said support arm.

22. The mirror device of claim 21 wherein said third rotatable coupler is further defined as comprising in combination a ball member located at said outer end of said support arm and having therethrough a channel which communicates with said through-passageway through said support arm, and a socket in said frame which frictionally and adjustably receives in a fluid-tight fit said ball member, said channel through said ban member having an outlet orifice which communicates through a socket passageway with said hollow interior space of said frame.

23. The mirror device of claim 22 wherein said mirror frame has therethrough at least one water outlet relief hole which communicates with said hollow interior space of said frame to enable water flow through said hollow interior space within said frame.

* * * * *